United States Patent
Riley et al.

(10) Patent No.: US 9,133,795 B2
(45) Date of Patent: Sep. 15, 2015

(54) ENGINE USING SPLIT FLOW EXHAUST SYSTEM AND METHODS

(71) Applicants: Michael B. Riley, Fort Collins, CO (US); Gregory James Hampson, Boulder, CO (US)

(72) Inventors: Michael B. Riley, Fort Collins, CO (US); Gregory James Hampson, Boulder, CO (US)

(73) Assignee: Woodward, Inc., Fort Collins, CO (US)

(*) Notice: Subject to any disclaimer, the term of this patent is extended or adjusted under 35 U.S.C. 154(b) by 220 days.

(21) Appl. No.: 13/730,458

(22) Filed: Dec. 28, 2012

(65) Prior Publication Data
US 2013/0174816 A1 Jul. 11, 2013

Related U.S. Application Data

(60) Provisional application No. 61/584,016, filed on Jan. 6, 2012.

(51) Int. Cl.
*F02M 25/07* (2006.01)
*F02B 41/08* (2006.01)
(Continued)

(52) U.S. Cl.
CPC ............. *F02M 25/077* (2013.01); *F01L 1/344* (2013.01); *F02B 37/00* (2013.01); *F02B 47/08* (2013.01); *F02D 13/0219* (2013.01); *F02D 13/0249* (2013.01); *F02D 13/0257* (2013.01); *F02M 25/0707* (2013.01); *F01N 13/107* (2013.01); *F02B 29/0406* (2013.01); *F02D 41/0007* (2013.01); *F02D 41/0047* (2013.01); *F02D 41/0065* (2013.01); *F02D 2041/001* (2013.01);
(Continued)

(58) Field of Classification Search
CPC .......... F02B 47/08; F02B 47/10; F02B 37/00; F02M 25/0707; F02M 25/077; F02M 25/071; F02D 13/0249; F02D 13/0257; F02D 13/0276

USPC ............ 123/568.11, 568.13, 568.12, 568.15, 123/568.2, 568.18, 90.17, 90.15, 90.16, 123/90.2, 90.18; 60/605.2, 612, 278, 279, 60/280
See application file for complete search history.

(56) References Cited

U.S. PATENT DOCUMENTS 6,155,216 A * 12/2000 Riley .......................... 123/90.15
6,347,619 B1 * 2/2002 Whiting et al. ........... 123/568.12
(Continued)

OTHER PUBLICATIONS

Motoyuki Takahashi et al.; Paper No. 108, Study of Exhaust Gas Separation (EGS) System on 2-stroke Engine; International Council on Combustion Engines; 2010; 12 pages.

*Primary Examiner* — Lindsay Low
*Assistant Examiner* — George Jin
(74) *Attorney, Agent, or Firm* — Reinhart Boerner Van Deuren P.C.

(57) ABSTRACT

An engine system utilizing a split flow exhaust system for distributing different portions of exhaust gases to a turbocharger and to an EGR system and methods of controlling the flow of the exhaust gases are provided. The split flow exhaust system includes a high-pressure exhaust valve in fluid communication with a turbine of a turbocharger and a high-pressure exhaust manifold interposed therebetween. Also, a low-pressure exhaust valve is in fluid communication with an intake system and a low-pressure exhaust manifold is interposed therebetween. Initial exhaust gases expelled from the engine are delivered to the turbine while secondary exhaust gases expelled from the engine are delivered as EGR to the intake system. The flow to the turbine and the intake system is controlled using the high-pressure exhaust valves and low-pressure exhaust valves of the engine rather than an EGR valve.

12 Claims, 10 Drawing Sheets

(51) Int. Cl.
  *F02B 47/08* (2006.01)
  *F01L 1/344* (2006.01)
  *F02B 37/00* (2006.01)
  *F02D 13/02* (2006.01)
  *F02B 29/04* (2006.01)
  *F02D 41/00* (2006.01)
  *F01N 13/10* (2010.01)

(52) U.S. Cl.
  CPC .... *F02D 2041/0075* (2013.01); *F02M 25/0751* (2013.01); *F02M 25/0796* (2013.01); *Y02T 10/121* (2013.01); *Y02T 10/144* (2013.01); *Y02T 10/18* (2013.01)

(56) References Cited

U.S. PATENT DOCUMENTS

| | | | |
|---|---|---|---|
| 6,953,030 B2* | 10/2005 | Linderyd et al. | 123/568.12 |
| 2008/0196681 A1* | 8/2008 | Lancefield et al. | 123/90.17 |
| 2010/0083922 A1* | 4/2010 | Riley | 123/90.2 |
| 2010/0199666 A1 | 8/2010 | VanDyne et al. | |
| 2010/0282193 A1* | 11/2010 | Timothy et al. | 123/90.17 |
| 2011/0000470 A1* | 1/2011 | Roth | 123/568.11 |
| 2012/0023935 A1* | 2/2012 | Pursifull et al. | 60/605.2 |
| 2012/0060492 A1* | 3/2012 | Pursifull et al. | 60/602 |
| 2012/0279215 A1* | 11/2012 | Roth et al. | 60/599 |
| 2014/0190458 A1* | 7/2014 | Gingrich et al. | 123/568.2 |

* cited by examiner

ENGINE USING SPLIT FLOW EXHAUST SYSTEM AND METHODS

CROSS-REFERENCE TO RELATED PATENT APPLICATION

This patent application claims the benefit of U.S. Provisional Patent Application No. 61/584,016, filed Jan. 6, 2012, the entire teachings and disclosure of which are incorporated herein by reference thereto.

FIELD OF THE INVENTION

This invention generally relates to exhaust systems for internal combustion systems and more particularly exhaust systems for internal combustion engines that utilize exhaust gas recirculation as well as one or more turbochargers to improve engine performance and to reduce emissions.

BACKGROUND OF THE INVENTION

Internal combustion engines use a combustion cycle to combust fuel and oxygen to convert the energy of the fuels into mechanical energy for powering devices such as automobiles, locomotives, generators, and many other devices.

Many modern engines (spark or compression ignition) utilize the exhaust gases expelled from the engine for various beneficial activities. One particular activity is the use of the exhaust gases to power a turbocharger. The flow of the exhaust gases drives a turbine of the turbocharger, which in turn drives a compressor to increase the amount of air supplied to the engine. The increased air to the engine allows higher power density, improving fuel efficiency as well as transient responsiveness.

Exhaust gases are also used to reduce emissions. One problem with internal combustion engines, and particularly diesel engines, is that at high combustion temperatures, NOx is generated. Further, the production of NOx is typically non-linear such that an incremental increase in temperature can significantly increase the rate of NOx production.

Another problem with internal combustion engines, and particularly diesel engines, is that when the combustion cycle operates relatively fuel rich, i.e. close to the stoichiometric ratio for complete combustion (but still with an excess of oxygen) the engine will produce a large amount of soot. The soot can inhibit the operation of the engine, downstream components of the exhaust system, as well as provide undesirable emissions.

With ever increasing energy/fuel costs as well as ever more stringent emission reduction regulations, it is desirable to increase the fuel efficiency while decreasing the amount of emissions generated.

To reduce NOx emissions, exhaust gas is recirculated, which is known as exhaust gas recirculation ("EGR", which will also be used to refer to the actual exhaust gas that is being recirculated), to reduce the in-cylinder temperatures during combustion. The primary components of EGR are carbon dioxide ("$CO_2$") and water vapor, plus nitrogen and leftover oxygen that wasn't consumed by the fuel in a previous cycle. In general, the exhaust gas is substantially inert. Carbon dioxide and water vapor have high specific heats relative to air. As such, it takes a larger amount of energy to raise the temperature of these components. Therefore, in-cylinder temperatures during combustion will be reduced with these gases present as compared to if they are not present. EGR can be used to reduce in-cylinder temperatures.

To improve the EGR's ability to control or limit in-cylinder temperature, the EGR is usually passed through an EGR cooler that removes heat energy from the EGR prior to mixing the EGR with the intake gas. This reduces the temperature of the EGR allowing the EGR to absorb more energy during combustion to more effectively control and maintain in-cylinder temperature.

A schematic illustration of a standard, four-stroke internal combustion engine 10 is illustrated in FIG. 1. As illustrated, the engine 10 includes a single exhaust manifold 12 coupled to all of the exhaust valves 14 of engine 10. The single exhaust manifold 12 collects all of the exhaust gases generated by the engine 10. A turbo flow path 15 couples the exhaust manifold 12 to the turbine 16 of the turbocharger 18. An EGR flow path 20 operably couples the exhaust manifold 12 to the intake flow path 22 to mix the EGR with the intake gases.

One problem with this current arrangement is that all the engine exhaust gas is fed into a single exhaust manifold, which is connected to both the EGR pathway and the turbine inlet pathway. The problem is that each of these pathways has separate requirements for optimal conditions: (a) the EGR pathway wants low temperature exhaust gases with just sufficient pressure to overcome the intake manifold pressure and drive just sufficient EGR flow from the exhaust manifold to the intake manifold, while (b) the turbine wants high temperature, high pressure and high mass flow to improve the turbocharger output and create the pressure in the intake manifold via turbocharging. Currently, the two functions are combined by use of the common exhaust manifold which leads to a compromise. The EGR loop is too hot and requires high pressure to drive the EGR, while the turbine loop is too cool and the pressure too low as the EGR loop has utilized some of the available pressure. The need for independence is driven home by the recognition that the turbine loop creates the boost pressure that the EGR loop must overcome and that extra temperature in the EGR loop must be removed via a heat exchanger. Once these are recognized, it is clear that it is very unlikely that a single exhaust valve timing to a common manifold will serve both EGR needs and turbine needs well.

Embodiments of the present invention provide improvements over the current state of the art to improve the distribution of the exhaust gases to the turbine as well as for use as EGR to improve fuel efficiency while reducing emissions. These and other advantages of the invention, as well as additional inventive features, will be apparent from the description of the invention provided herein.

BRIEF SUMMARY OF THE INVENTION

New and improved internal combustion engine systems and methods of controlling exhaust gas flow from internal combustion engine systems are provided. More particularly, new and improved internal combustion engine systems and methods of controlling exhaust gas flow using split flow exhaust are provided. The new and improved systems and methods are configured to separate the exhaust gas based on the thermodynamic state thereof. Therefore, the most thermodynamically proper exhaust gas can be used to power the turbine of a turbocharger and the most thermodynamically proper exhaust gas is used as EGR for reducing, among other things, NOx emissions. Increasing the quantity of air in diesel engines, achievable due to increased turbine power, allows leaner operation and potentially reduced soot production.

In one particular embodiment, an internal combustion engine system including an engine block, a gas intake system, a gas exhaust system, a crankshaft and a valve phaser device is provided. The engine block defines a cylinder. The gas intake system includes an intake manifold, at least one intake valve interposed between the cylinder and the intake manifold, and an intake valve control device operably coupled to the at least one intake valve to control opening and closing of the intake valve. The gas exhaust system includes a high pressure exhaust manifold, at least one high pressure exhaust valve interposed between the cylinder and the high pressure exhaust manifold, and a high pressure exhaust valve control device operably coupled to the at least one high pressure exhaust valve to control opening and closing of the at least one high pressure exhaust valve. The gas exhaust system also includes a low pressure exhaust manifold, at least one low pressure exhaust valve interposed between the cylinder and the low pressure exhaust manifold, and a low pressure exhaust valve control device operably coupled to the at least one low pressure exhaust valve to control opening and closing of the at least one low pressure exhaust valve. The valve phaser device is operably coupled to the intake valve control device and the low pressure exhaust valve control device and is configured to simultaneously retard or advance operation of the at least one intake valve and the at least one low pressure exhaust valve relative to the crankshaft.

By coupling the valve phaser device to both the intake valve control device and, at least, the low pressure exhaust valve device, a more simplified and cost effective control system can be provided without significantly compromising engine output efficiency or NOx and soot reduction.

In a more particular embodiment, the intake valve control device and the low pressure exhaust valve control device are cam lobes on a camshaft and the valve phaser device is a single cam phaser. In a more particular embodiment, the intake valve control device, the high pressure exhaust valve control device, and the low pressure exhaust valve control device are separate lobes on a single camshaft and the single valve phaser device is a single cam phaser.

In one embodiment, the single valve phaser device is also operably coupled to the intake valve control device, the high pressure exhaust valve control device, and the low pressure exhaust valve control device and the single valve phaser device is configured to simultaneously retard or advance operation of the at least one intake valve, the at least one high pressure exhaust valve and the at least one low pressure exhaust valve relative to the crankshaft.

In a more particular embodiment, the intake valve control device is a lobe on a first camshaft; the high pressure exhaust valve control device is at least one first lobe on a second camshaft configured to control the operation of the at least one high pressure exhaust valve; and the low pressure exhaust valve control device is at least one second lobe on the second camshaft configured to control the operation of the at least one low pressure exhaust valve. The at least one second lobe on the second camshaft is configured differently than the at least one first lobe on the second camshaft.

In one embodiment, the engine block defines a plurality of combustion cylinders. The at least one high pressure exhaust valve includes a plurality of high pressure exhaust valves with each combustion cylinder having at least one high pressure exhaust valve. The at least one low pressure exhaust valve includes a plurality of low pressure exhaust valves with each combustion cylinder having at least one low pressure exhaust valve. The at least one first lobe on the second camshaft includes a plurality of first lobes associated with the plurality of high pressure exhaust valves and the at least one second lobe on the second camshaft includes a plurality of second lobes.

In a further embodiment, an internal combustion engine system including an internal combustion engine, an intake system, an exhaust system, a turbocharger, and an exhaust gas recirculation system is provided. The internal combustion engine defines a combustion cylinder. The intake system delivers intake gases to the engine. The exhaust system carries exhaust gases away from the engine. The exhaust system includes a high pressure exhaust manifold; a high pressure exhaust valve interposed between the combustion cylinder and the high pressure exhaust manifold; and a low pressure exhaust manifold; and a low pressure exhaust valve interposed between the combustion cylinder and the low pressure exhaust manifold. The turbocharger includes a turbine in the exhaust system in fluid communication with the high pressure exhaust manifold. The exhaust gas recirculation system (EGR system) fluidly couples the low pressure exhaust manifold to the air intake system. The EGR system is free of an exhaust gas recirculation valve (EGR valve) interposed between the low pressure exhaust manifold and the air intake system.

In this embodiment, the EGR valve is eliminated eliminating an expensive warranty-prone component from the engine system. The EGR valve may be removed because the flow of EGR from the exhaust system to the intake system is controlled primarily by the low pressure exhaust valves.

In a more particular embodiment, EGR system includes an exhaust gas recirculation cooler (EGR cooler).

In a further embodiment, a valve control system is provided. The valve control system is configured to control opening and closing of the high pressure exhaust valve and control opening and closing of the low pressure exhaust valve. The valve control system is configured to vary the opening and closing angles of the high pressure exhaust valve and configured to vary the opening and closing angles of the low pressure exhaust valve. This adjusts the portion of exhaust gas that is admitted into the individual ones of the high pressure and low pressure exhaust manifolds.

In a further embodiment, the valve control system is configured to adjust opening and closing of the high pressure exhaust valve independent of the opening and closing of the low pressure exhaust valve. As such, the control of the high pressure and low pressure exhaust valves is wholly independent and not mechanically tied.

In one embodiment, the valve control system is configured to retard or advance the opening and closing of the high pressure exhaust valve and is configured to retard or advance the opening and closing of the low pressure exhaust valve.

In one embodiment, an intake valve is provided. The valve control system is configured to control opening and closing of the intake valve.

In a more particular embodiment, the valve control system is configured to jointly retard or advance opening and closing of the intake valve and retard or advance opening and closing the low pressure exhaust valve such that the timing of the intake valve and low pressure exhaust valve must be advanced or retarded together.

In an even more particular embodiment, the valve control system is configured to retard or advance opening and closing of the high pressure exhaust valve independent of any adjustment in retarding or advancement of the opening and closing of the intake valve.

In one embodiment, a diverter system is provided within the EGR system. The diverter system is configured to fluidly connect the low pressure exhaust manifold to the air intake system in a first state and fluidly connect the low pressure exhaust manifold to an exhaust outlet downstream of the turbine in a second state. The diverter system is not able to incrementally adjust the amount of flow from the low pressure exhaust manifold to the air intake system through the diverter system. In this embodiment, the diverter system does not include an EGR valve.

In one embodiment, the EGR system includes a diverter system. The diverter system is configured to fluidly connect the low pressure exhaust manifold to the air intake system in a first state and fluidly connect the low pressure exhaust manifold to the exhaust system upstream of the turbine in a second state. The diverter system not able to incrementally adjust the amount of flow therethrough.

In one more particular embodiment, the diverter system is further configured to fluidly connect the low pressure exhaust manifold to the exhaust system downstream of the turbine in a third state.

In one embodiment, the fluid coupling between the low pressure exhaust manifold and the air intake system is free of valves.

In one embodiment, a low pressure exhaust valve control device is operably coupled to the at least one low pressure exhaust valve to control opening and closing of the low pressure exhaust valve. The low pressure exhaust valve control device is configured to open the low pressure exhaust valve control device at or after bottom dead center of a piston within the combustion cylinder of a four-stroke engine.

In a further more particular embodiment, a method of controlling exhaust flow from an internal combustion engine system is provided. The engine system includes an intake system; a high pressure exhaust system including a high pressure exhaust valve operably in fluid communication with a turbine of a turbocharger; and a low pressure exhaust system including a low pressure exhaust valve operably in fluid communication with the intake system by an exhaust gas recirculation system (EGR system). The method includes driving the turbine with a first exhaust gas flow passing through the high pressure exhaust system having a first thermodynamic characteristic of a first value; and recirculating a second exhaust gas flow to the intake system through the EGR system from the low pressure exhaust system, the second exhaust gas flow having a second value for the first thermodynamic characteristic, the second value being different than the first value.

In a more particular method, the first thermodynamic characteristic is entropy and the first value is greater than the second value. In a further method, the first value is at least 50 J/(kg-K) greater than the second value.

In a further embodiment, a method of controlling exhaust flow from an internal combustion engine system is provided. The engine system includes an intake system; a high pressure exhaust system including a high pressure exhaust valve ("HP exhaust valve") operably in fluid communication with a turbine of a turbocharger, and a low pressure exhaust system including a low pressure exhaust valve operably in fluid communication with the intake system by an exhaust gas recirculation system (EGR system). The method includes driving the turbine of the turbocharger with a first portion of exhaust gas expelled from the internal combustion engine through the HP exhaust valve; recirculating a second portion of exhaust gas expelled from the internal combustion engine through the LP exhaust valve to the intake system through the EGR system; receiving an intake gas pressure set point representing a desired intake gas pressure; and phasing the HP exhaust valve based on the intake gas pressure set point to provide a flow of the first portion of exhaust gas at a sufficient flow rate to drive the turbine with sufficient power to provide the desired intake gas pressure.

In a more particular embodiment, the method includes measuring an actual intake gas pressure value; comparing the actual intake gas pressure value with the intake gas pressure set point; and adjusting the phasing of the HP exhaust valve if the actual intake gas pressure value is outside of a predetermined range of the intake gas pressure set point.

In one embodiment, the step of adjusting the phasing of the HP exhaust valve includes advancing the phasing of the HP exhaust valve if the actual intake gas pressure value is less than the predetermined range. Additionally, the step of adjusting the phasing of the HP exhaust valve may include retarding the phasing of the HP exhaust valve if the actual intake gas pressure value is greater than the predetermined range.

In one embodiment, the method further includes measuring the pressure and temperature of the first portion of exhaust gas. Additionally, phasing the HP exhaust valve includes determining a phase using the intake gas pressure set point, measured pressure, measured temperature and a theoretical intake gas pressure control model. The method also includes measuring an actual intake gas pressure value; comparing the intake gas pressure set point with the actual intake gas pressure value; and modifying the theoretical intake gas pressure control model based on variations between the intake gas pressure set point and the actual intake gas pressure value. This method provides for feed forward adaptive control.

In a more particular embodiment, the pressure and temperature of the first portion of exhaust gas are sampled within an HP exhaust manifold interposed between the HP exhaust valve and the turbine of the turbocharger.

In a further embodiment, the step of modifying the theoretical intake gas pressure control model includes adjusting constants within the theoretical intake gas pressure control model.

In one embodiment, the step of phasing the HP exhaust valve includes determining a predicted phasing of the HP exhaust valve using a theoretical intake gas pressure control model.

In one embodiment, the method further comprises: measuring the pressure and temperature of the first portion of exhaust gas; and wherein determining the phasing of the HP exhaust valve includes using the intake gas pressure set point, the measured pressure and temperature of the first portion of exhaust gas and the theoretical intake gas pressure control model.

In one embodiment, the method further comprises: measuring an actual intake gas pressure value; comparing the intake gas pressure set point with the actual intake gas pressure value; and modifying the theoretical intake gas pressure control model based on variations between the intake gas pressure set point and the actual intake gas pressure value.

In a further embodiment, a method of controlling exhaust flow from an internal combustion engine system is provided. The engine system includes an intake system; a high pressure exhaust system including a high pressure exhaust valve ("HP exhaust valve") operably in fluid communication with a turbine of a turbocharger, and a low pressure exhaust system including a low pressure exhaust valve operably in fluid communication with the intake system by an exhaust gas recirculation system (EGR system). The method includes driving the turbine of the turbocharger with a first portion of exhaust gas expelled from the internal combustion engine through the HP exhaust valve; recirculating a second portion of exhaust gas expelled from the internal combustion engine through the LP exhaust valve to the intake system through the EGR system; receiving an EGR flow rate set point; and phasing the LP exhaust valve to provide a flow rate of the second portion of exhaust gas at a sufficient flow rate and thermodynamic state to provide EGR to the intake system at the EGR flow rate set point.

In a more particular embodiment, the method includes measuring an actual temperature value of the second portion of exhaust gas; comparing the actual temperature value with a temperature set point temperature; and adjusting the phasing of the HP and/or LP exhaust valves if the actual temperature value is not within a predetermined range of the temperature set point.

In an even more particular embodiment, the step of adjusting the phasing of the HP and/or LP exhaust valves includes retarding the phasing of the HP exhaust valve and either advancing or retarding the LP exhaust valve if the actual EGR temperature is greater than the predetermined range.

In a further embodiment, the step of adjusting the phasing of the HP and/or LP exhaust valves includes advancing the phasing of the HP exhaust valve and either advancing or retarding the LP exhaust valve if the actual EGR temperature value is less than the predetermined range.

In one embodiment, the method includes measuring an actual EGR flow rate of the second portion of exhaust gas; comparing the actual EGR flow rate with the EGR flow rate set point; and adjusting the phasing of the HP and/or LP exhaust valves if the actual EGR flow rate is not within a predetermined range of the EGR flow rate set point.

In one embodiment, the step of adjusting the phasing of the HP and/or LP exhaust valves includes retarding the phasing of the HP exhaust valve and either advancing or retarding the LP exhaust valve if the actual EGR flow rate is greater than the predetermined range.

In another embodiment, the step of adjusting the phasing of the HP and/or LP exhaust valves includes advancing the phasing of the HP exhaust valve and either advancing or retarding the LP exhaust valve if the actual EGR flow rate is less than the predetermined range.

In another embodiment, the method includes measuring an actual pressure value and an actual temperature value of the second portion of exhaust gas and phasing the HP and/or LP exhaust valves includes determining a phase using the EGR flow rate set point, the actual pressure value, the actual temperature value and a theoretical EGR flow control model. The method further includes measuring an actual EGR flow rate; comparing the EGR flow rate set point with the actual EGR flow rate value; and modifying the theoretical EGR flow control model based on variations between the EGR flow rate set point and the actual EGR flow rate value.

In a further embodiment, the method includes comparing the actual temperature value with a temperature set point; and adjusting the phasing of the HP and/or LP exhaust valves if the actual temperature value is not within a predetermined range of the temperature set point.

In a further embodiment, the step of adjusting the phasing of the HP and/or LP exhaust valves includes retarding the phasing of the HP exhaust valve and either advancing or retarding the LP exhaust valve if the actual EGR temperature is greater than the predetermined range.

In another embodiment, the method includes comparing the actual temperature value with a temperature set point; and modifying the theoretical EGR flow control model if the actual temperature value is not within a predetermined range of the temperature set point.

In further embodiments, the NOx production can be monitored and the valve timing of both the high-pressure and low-pressure exhaust valves can be adjusted when the NOx levels are above a predetermined threshold. In some instances, the step of adjusting the phasing of the HP and/or LP exhaust valve includes advancing the phasing of the HP exhaust valve and either advancing or retarding the phasing of the LP exhaust valve if a measured level of NOx is greater than the predetermined threshold. This will cause a greater quantity of exhaust gases to be used as EGR which should further assist in reduction of NOx.

Further, the measured NOx levels can be used to adjust any theoretical models relating to EGR control and particularly a theoretical EGR flow control model.

In a more particular method, the method further comprises: measuring a measured NOx value in the exhaust gas; and comparing the measured NOx with a predetermined NOx threshold value; and adjusting the phasing of the HP exhaust valve if the measured NOx value is above the predetermined NOx threshold.

In a further more particular method, the step of adjusting the phasing of the HP exhaust valve includes retarding the phasing of the HP exhaust valve.

In a more particular method, the method further comprises modifying a theoretical EGR flow control model based on variations between the measured NOx value and the predetermined NOx threshold value.

In one embodiment, the method further comprises adjusting the phasing of the LP exhaust valve if the measured NOx value is above the predetermined NOx threshold.

In one embodiment, the steps of adjusting the phasing of the HP and LP exhaust valves includes advancing or retarding the HP exhaust valve while advancing the phasing of the LP exhaust valve.

In one embodiment, the method further comprises: measuring a measured NOx value in the exhaust gas; and comparing the measured NOx with a predetermined NOx threshold value; and adjusting the phasing of the LP exhaust valve if the measured NOx value is above the predetermined NOx threshold.

In another embodiment, an internal combustion engine system providing fully independent variable valve timing is provided. The internal combustion engine includes an engine block, a gas intake system, a gas exhaust system, a crank shaft and at least one valve phaser device. The engine block defines a combustion cylinder. The gas intake system includes an intake manifold, at least one intake valve interposed between the cylinder and the intake manifold, and an intake valve control device operably coupled to the at least one intake valve to control opening and closing of the intake valve. The gas exhaust system includes a high pressure exhaust manifold, at least one high pressure exhaust valve interposed between the cylinder and the high pressure exhaust manifold, and a high pressure exhaust valve control device operably coupled to the at least one high pressure exhaust valve to control opening and closing of the at least one high pressure exhaust valve. The gas exhaust system further includes a low pressure exhaust manifold, at least one low pressure exhaust valve interposed between the cylinder and the low pressure exhaust manifold, and a low pressure exhaust valve control device operably coupled to the at least one low pressure exhaust valve to control opening and closing of the at least one low pressure exhaust valve. The at least one valve phaser device is operably coupled to the intake valve control device, the high pressure exhaust valve control device and the low pressure exhaust valve control device and is configured to independently retard or advance operation of the at least one intake valve, the at least one high pressure exhaust valve, and the at least one low pressure exhaust valve relative to the crankshaft.

The at least one valve phaser device can be one or more devices. For instance, in one more particular embodiment, the intake valve control device includes a first camshaft, the high pressure exhaust valve control device includes a second camshaft and the low pressure exhaust valve control device includes a third camshaft. The at least one valve phaser device includes a plurality of devices wherein each of the devices only controls the timing of one of the camshafts. More particularly, the at least one valve phaser device includes first, second and third cam phasers. The first cam phaser is operably coupled to only the first camshaft to retard or advance operation of only the at least one intake valve independent of the at least one high pressure exhaust valve and the at least one low pressure exhaust valve. The second cam phaser is operably coupled to only the second camshaft to retard or advance operation of only the at least one high pressure exhaust valve independent of the at least one low pressure exhaust valve. and the at least one intake valve. The third cam phaser is operably coupled to only the third camshaft to retard or advance operation of only the at least one low pressure exhaust valve independent of the at least one high pressure exhaust valve and the at least one intake valve.

In an alternative embodiment, the inventive aspects may be applied to an internal combustion engine that does not include adjustable intake valves such as in a two-stroke diesel engine. The internal combustion engine system includes an engine block defining a combustion cylinder, a gas intake system including an intake manifold, a gas exhaust system, a crankshaft, and at least one valve phaser device. The exhaust system includes a high pressure exhaust manifold, at least one high pressure exhaust valve interposed between the cylinder and the high pressure exhaust manifold, and a high pressure exhaust valve control device operably coupled to the at least one high pressure exhaust valve to control opening and closing of the at least one high pressure exhaust valve. The exhaust system also includes a low pressure exhaust manifold, at least one low pressure exhaust valve interposed between the cylinder and the low pressure exhaust manifold, and a low pressure exhaust valve control device operably coupled to the at least one low pressure exhaust valve to control opening and closing of the at least one low pressure exhaust valve. The at least one valve phaser device is operably coupled to the high pressure exhaust valve control device and the low pressure exhaust valve control device and is configured to independently retard or advance operation of the at least one high pressure exhaust valve and the at least one low pressure exhaust valve relative to the crankshaft.

The at least one valve phaser device can be one or more devices. For instance, in one embodiment, the high pressure exhaust valve control device includes a first camshaft and the low pressure exhaust valve control device includes a second camshaft. The at least one valve phaser device includes first and second cam phasers. The first cam phaser is operably coupled to only the first camshaft to retard or advance operation of only the at least one high pressure exhaust valve independent of the at least one low pressure exhaust valve. The second cam phaser is operably coupled to only the second camshaft to retard or advance operation of only the at least one low pressure exhaust valve independent of the at least one high pressure exhaust valve.

In an alternative embodiment, the valve timing of the high pressure and low pressure exhaust valves may be coupled, such as in a two-stroke diesel engine. The internal combustion engine system includes an engine block defining a combustion cylinder, a gas intake system including an intake manifold, a gas exhaust system, a crankshaft, and a single valve phaser device. The exhaust system includes a high pressure exhaust manifold, at least one high pressure exhaust valve interposed between the cylinder and the high pressure exhaust manifold, and a high pressure exhaust valve control device operably coupled to the at least one high pressure exhaust valve to control opening and closing of the at least one high pressure exhaust valve. The exhaust system also includes a low pressure exhaust manifold, at least one low pressure exhaust valve interposed between the cylinder and the low pressure exhaust manifold, and a low pressure exhaust valve control device operably coupled to the at least one low pressure exhaust valve to control opening and closing of the at least one low pressure exhaust valve. The single valve phaser device is operably coupled to the high pressure exhaust valve control device and the low pressure exhaust valve control device and is configured to simultaneously retard or advance operation of the at least one high pressure exhaust valve and the at least one low pressure exhaust valve relative to the crankshaft.

In one embodiment, the high pressure exhaust valve control device and the low pressure exhaust valve control device are provided by different cam lobes of a single camshaft. The single valve phaser device is operably coupled to the single camshaft.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 2:
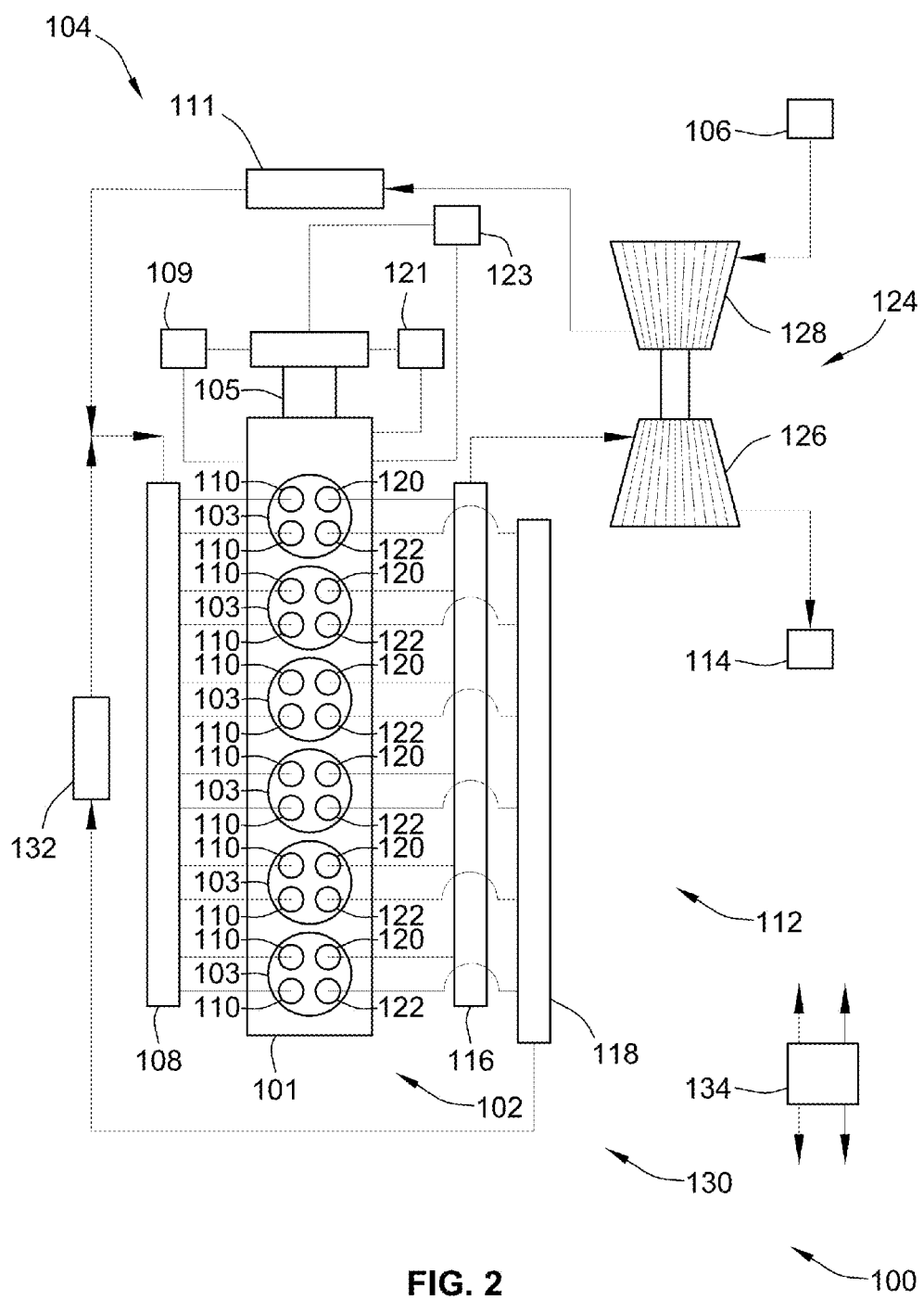
FIG. 2 is a schematic illustration of an embodiment of an engine system according to the present invention including a split flow exhaust arrangement.

FIG. 2 is a schematic illustration of an embodiment of an engine system 100 according to the teachings of the present invention. The engine system 100 is configured to improve fuel efficiency and reduce emissions by utilizing a split flow exhaust system for controlling the use of exhaust gases. This type of system may also be referred to here in as a "split flow design." The engine system 100 controls the use of the exhaust gases to maximize the thermodynamic properties of the exhaust gas for various operations including powering a turbocharger as well as providing exhaust gas recirculation (EGR) for reducing, among other things, NOx emissions and soot production. As noted above "EGR" will also be used to refer to the actual exhaust gas that is recirculated to the fresh air intake side of the engine system 100.

The engine system 100 and various subsystems and components of the engine system 100 will first be introduced.

As is well known, the engine system 100 generally includes an internal combustion engine 102 that is configured to combust induction gases with fuel to generate mechanical energy. Combustion occurs within combustion cylinders 103 ("cylinders 103") of an engine block 101 of the internal combustion engine 102. The combustion of the fuel and induction gas mixture drives pistons (not shown) that are operably coupled to a crankshaft 105 to generate rotational motion from the combusted gases. The motion of the crankshaft 105 can then be used to power a device such as a vehicle, a generator, other machine, etc. The engine block 101, pistons and a cylinder head (not shown) define combustion chambers where the induction gases are mixed with the fuel are compressed and then combusted.

The engine system 100 includes an intake system 104 for supplying induction gases to the cylinders 103 to be mixed with fuel for conversion into mechanical energy. The intake system 104 typically includes an inlet 106 exposed to a source of induction gases, typically the ambient air surrounding the engine system 100. The inlet 106 is operably fluidly connected to an intake manifold 108 by a network of piping between the inlet and the intake manifold 108.

A plurality of intake valves 110 are operably interposed between the intake manifold 108 and the cylinders 103 to selectively control delivery of the induction gases to the cylinders 103. The intake valves 110 can take on various forms and could, for example, be cam actuated or solenoid actuated valves. Further, while each cylinder 103 is shown with two intake valves, other embodiments may have more or fewer intake valves associated with a given cylinder 103.

An intake valve control device 109 ("IV control device 109") is operably coupled to and interacts with the intake valves 110 to control opening and closing the intake valves 110. At a minimum, the intake valve control device 109 could take the form of a lobed camshaft operably coupled to the crankshaft 105, such as for example by a timing belt, timing chain, or potentially gears. In alternative embodiments, the IV control device 109 can include a valve phasing device for adjusting the timing for opening and closing the intake valves 110, such as a cam phaser. Further yet, the intake valve control device 109 could include electronic controls or be part of or coupled to an electronic control unit 134 of the engine system 100 for controlling valve opening and closing as well as adjusting timing thereof. Further yet, the intake valve control device 109 could include solenoid or other non-cam valve actuators as are generally known in the art.

In the illustrated embodiment, an intake cooler 111 is interposed between the turbocharger compressor 128 and the intake manifold to cool the induction gases prior to delivery to the cylinders 103. The intake cooler 111 is typically an air-to-air heat exchanger, however, other cooling devices could be implemented.

The engine system 100 also includes an exhaust system 112 configured to, in general, carry exhaust gases away from the internal combustion engine 102. The exhaust system 112 includes an outlet 114 through which the exhaust gases are ultimately expelled from the engine system 100. Typically, the exhaust gases are expelled back into the ambient surrounding the internal combustion engine 102.

The exhaust system 112 is generally a split flow exhaust system that includes a high-pressure exhaust manifold 116 ("HP exhaust manifold 116") and a low-pressure exhaust manifold 118 ("LP exhaust manifold 118") that collect separate portions of the exhaust gases as the exhaust gases exit the cylinders 103. A plurality of high-pressure exhaust valves 120 ("HP exhaust valves 120") are fluidly interposed between the HP exhaust manifold 116 and the cylinders 103 to selectively allow a first portion of the exhaust gases to exit the cylinders 103 into the HP exhaust manifold. Similarly, a plurality of low-pressure exhaust valves 122 ("LP exhaust valves 122") are fluidly interposed between the LP exhaust manifold 118 and the cylinders 103 to selectively allow a second portion of the exhaust gases to exit the cylinders 103 into the LP exhaust manifold 118.

The HP and LP exhaust valves 120, 122 can take on various forms and could, for example, be cam actuated or solenoid actuated valves. Further, while each cylinder 103 is shown with one HP exhaust valve 120 and one LP exhaust valve 122, other embodiments may have more HP exhaust valves, or more LP exhaust valves 120, 122 associated with a given cylinder 103. Further, a single cylinder 103 need not have the same number of HP exhaust valves 120 as LP exhaust valves 122. The HP and LP exhaust valves 120, 122 can be configured differently in shape, size, lift, etc.

A high-pressure exhaust valve control device 121 ("HPEV control device 121") is operably coupled to and interacts with the HP exhaust valves 120 to control opening and closing the HP exhaust valves 120. A low-pressure exhaust valve control device 123 ("LPEV control device 123") operably interacts with the LP exhaust valves 122 to control opening and closing the LP exhaust valves 122. The HPEV control device 121 and LPEV 123 could take the form of separate lobed camshafts operably coupled to the crankshaft 105, such as by a timing belt or timing chain. In alternative embodiments, the HPEV control device 121 and LPEV control device 123 can include valve phaser mechanisms such as cam phasers for adjusting the timing for opening and closing the HP exhaust valves 120 and LP exhaust valves 122, respectively. Further yet, the HPEV control device 121 and LPEV control device 123 could include electronic controls or be part of or coupled to the electronic control unit 134 of the engine system 100 for controlling valve opening and closing as well as adjusting timing thereof. Further yet, the HPEV control device 121 and LPEV control device 123 could include solenoid or other non-cam valve actuators as are generally known in the art for adjusting valve timing. When using camshafts as part of the HPEV control device 121 and the LPEV control device 123, the camshafts are typically separate from one another such as when using fully independent variable valve timing. However, when using equal variable valve timing, the HPEV control device and LPEV control device could be separate sets of lobes on a single camshaft. One set of lobes would be configured for operating the HP exhaust valves 120 and the other set of lobes would be configured for operating the LP exhaust valves 122.

When using equal variable valve timing for the exhaust valves as well as the intake valves, the same camshaft could have three different sets of lobes, one set of lobes configured as being the IV control device 109 for operating the IV valves, the second set of lobes being configured as the HPEV control device 121 for controlling the HP exhaust valves 120 and the third set of lobes being configured as the LPEV control device 123 for controlling the LP exhaust valves 122. Alternatively, various ones of the camshafts controlling the IV valves, the HP exhaust valves and the LP exhaust valves could be mechanically coupled such as by timing chains or gears such that they adjust timing equally.

Other valve phasing devices can be used in embodiments of the present invention other than cam phasers. For instance, the eccentric sleeve valve phasing devices disclosed in U.S. Pat. No. 6,155,216 to Riley, entitled "Variable Valve Apparatus" (hereinafter "the '216 patent"), the teachings and disclosure of which are incorporated herein in their entireties by reference thereto, could be used for adjusting valve timing. For example, if the system uses fully independent valve timing, the IV control device 109 can include a camshaft and a cam phaser as discussed above. The HPEV control device 121 and LPEV control device 123 could then be provided by a mechanism using the eccentric sleeve valve phasing device of the '216 patent.

Further valve phasing devices may be used. For example, a device that adjusts the position of a rocker arm for adjusting valve timing such as illustrated in U.S. Pat. Appl. Publ. No. US 2010/0083922, to Riley, entitled "Varying the Phase and Lift of a Rocker Arm on a Camshaft Actuating a Valve or Injector" (hereinafter "the '922 Publication"), the teachings and disclosures of which are incorporated herein in their entireties by reference thereto.

Valve phasing devices can also include electrohydraulic or electromechanical valve phasing devices.

As such, embodiments of the invention may use alternative mechanisms for adjusting valve timing.

The engine system 100 includes a turbocharger 124 that includes a turbine 126 operably positioned within the exhaust system 112 and in fluid communication with the exhaust gases such that exhaust gases exiting the internal combustion engine 102 through, at least and typically only, the HP exhaust manifold 116 drive the turbine 126. The turbine 126 is fluidly interposed between the HP exhaust manifold 116 and the exhaust outlet 114 and particularly upstream of the exhaust outlet 114 and downstream of the HP exhaust manifold 116.

The turbocharger may use a fixed geometry turbine such as in a free-flowing turbocharger or a wastegated turbocharger but is preferably a variable geometry turbine ("VGT turbine") where the opening into the turbine is variable to throttle exhaust gases and allow for controlling back pressure among other things. Additionally, the turbocharger could utilize a variable nozzle turbine.

In the illustrated embodiment, the turbine 126 is operably coupled to a compressor 128 of the turbocharger 124 that is operably positioned within the intake system 104 to assist in increasing the mass and pressure of the induction gases supplied to the internal combustion engine 102. The compressor 128 is preferably upstream of the intake cooler 111 such that heat energy added to the induction gases can be removed using the intake cooler 111. In alternative embodiments, the turbine 126 could be operably coupled to a turbo compounding transmission such that the turbine shaft may be operably coupled to the crankshaft of the engine 102. "Turbocharger" as used herein shall be generic to cover at least these configurations where a turbine drives a compressor or is a turbo compounding transmission.

The engine system 100 includes an exhaust gas recirculation system 130 ("EGR system 130") for delivering EGR to the intake system 104. The EGR system 130 fluidly couples the LP exhaust manifold 118 to the intake system 104 such that exhaust gases collected in the LP exhaust manifold 118 provide the supply of EGR. Again, EGR can be used to reduce cylinder temperature thereby reducing the NOx production of the engine system 100.

The EGR system 130 includes an EGR cooler 132 through which the EGR is passed and cooled prior to supplying the EGR to the intake system 104. The EGR cooler 132 may take various forms such as air-to-liquid or air-to-air heat exchangers.

Some embodiments of the engine system 100 will include an electronic control unit 134 ("ECU 134") that is operably coupled to the components of the engine system 100 to control and monitor the operations of the various components and the system as a whole. The ECU 134 may be operably coupled to various sensors for monitoring the engine system 100, these sensors may sense throttle position, crank position, cam sensors, coolant temperature, HP and LP exhaust port temperatures, HP and LP exhaust pressure and temperature, NOx measurement before any NOx aftertreatment system, VVT position if not predicated on cam position, cylinder pressure, EGR flow rate, EGR pressure and temperature, engine speed among others. Further, the ECU 134 may be operably connected to the intake valve control device 109, HPEV control device 121 and the LPEV control device 123 to control, i.e. retard and/or advance, the timing of the opening and closing of the intake valves 110, the HP exhaust valves 120 and the LP exhaust valves 122, respectively.

Figure 1:
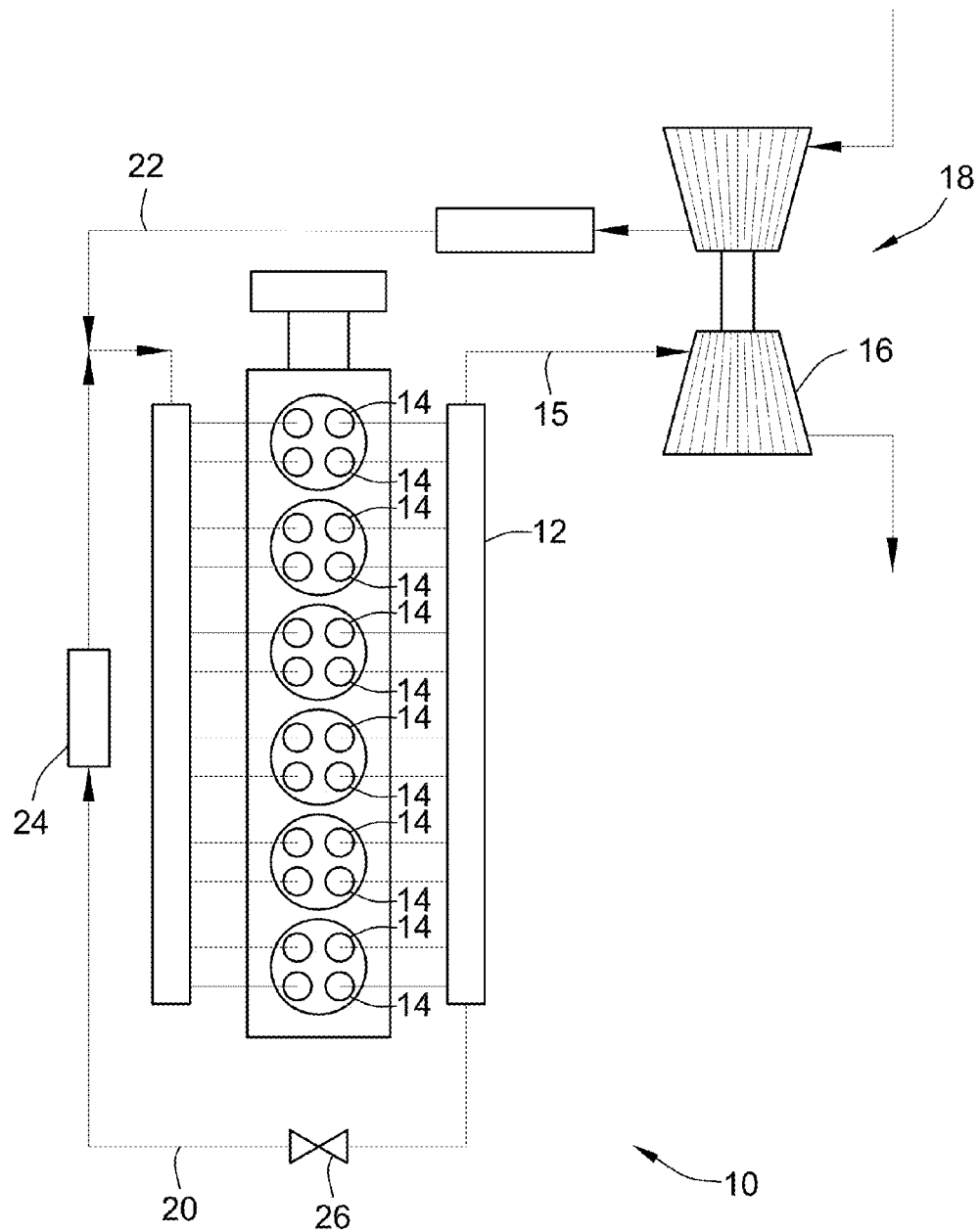
FIG. 1 is a schematic illustration of a prior art engine system.

It is a benefit of the split flow exhaust system that there is no need, if properly tuned and configured, to include an EGR valve in the EGR system. As such, there is no need for an active valve for incrementally throttling the amount of EGR that is recirculated, unlike prior systems such as illustrated in FIG. 1. Instead, the LP exhaust valves 122 and the LPEV control device 123 can be configured to control the amount of EGR that is recirculated back to the intake system 104 and the engine system 100 is entirely free of an EGR valve interposed between the low pressure exhaust manifold and the intake system. By eliminating the EGR valve, a warranty-prone/expensive component can be removed from the system and the control of EGR is performed by the exhaust valves.

By using a split flow exhaust system, such as illustrated in FIG. 2, utilizing separate independent exhaust manifolds coupled to separate independent sets of exhaust valves 120, 122, control of which exhaust gas is used for what purpose can be optimized such that the most thermodynamically optimal exhaust gas is used to power the turbine 126 of turbocharger 124 while the most thermodynamically optimal exhaust gas is used as EGR.

The split flow exhaust system separates the exhaust gas according to its potential to optimize flow work in the turbine while delivering a desired mass flow range of EGR back to the intake manifold. It has been determined that the initial exhaust gases that exit the cylinders 103 of the internal combustion engine 102 have an initial high pressure spike and are typically at a higher temperature and therefore have a high work potential. As such, using the split exhaust system design described above, the initial high-pressure exhaust gases ("HP exhaust gases") can be directed to the turbine 126 of the turbocharger 124. This HP exhaust gas is expelled from the cylinders 103 through the HP exhaust valves 120 and directed to the turbine 126 of the turbocharger to optimize the energy available to power the turbocharger 124 to increase boost potential for the system.

Then, subsequently expelled low-pressure exhaust gases ("LP exhaust gases"), which tend to be cooler in temperature and at lower pressure, can be expelled from the cylinders 103 through the LP exhaust valves 122 and directed through the EGR system 130 to the intake system 104 and utilized as EGR. Because the LP exhaust gases tend to be at a lower temperature, the LP exhaust gases are better suited for EGR. One direct benefit is that less heat energy need be extracted from the EGR. As such, a smaller EGR cooler 132 having a smaller load rating can be provided reducing cost.

The utilization of such a split flow exhaust system can provide increased fuel efficiency and an improved air-to-fuel ratio without risking an increase in NOx production. This is particularly true when a measurable difference is present between the thermodynamic properties of the HP exhaust gases and the LP exhaust gases. One such measurable difference is that an average entropy difference of at least 50 J/(kg-K) exists between EGR and turbine exhaust flows for engine operation above approximately 20% of full load. In this operation state, the system has significant benefits as it relates to the fuel efficiency and emissions of internal combustion engines and, particularly, diesel internal combustion engines.

Figure 3:
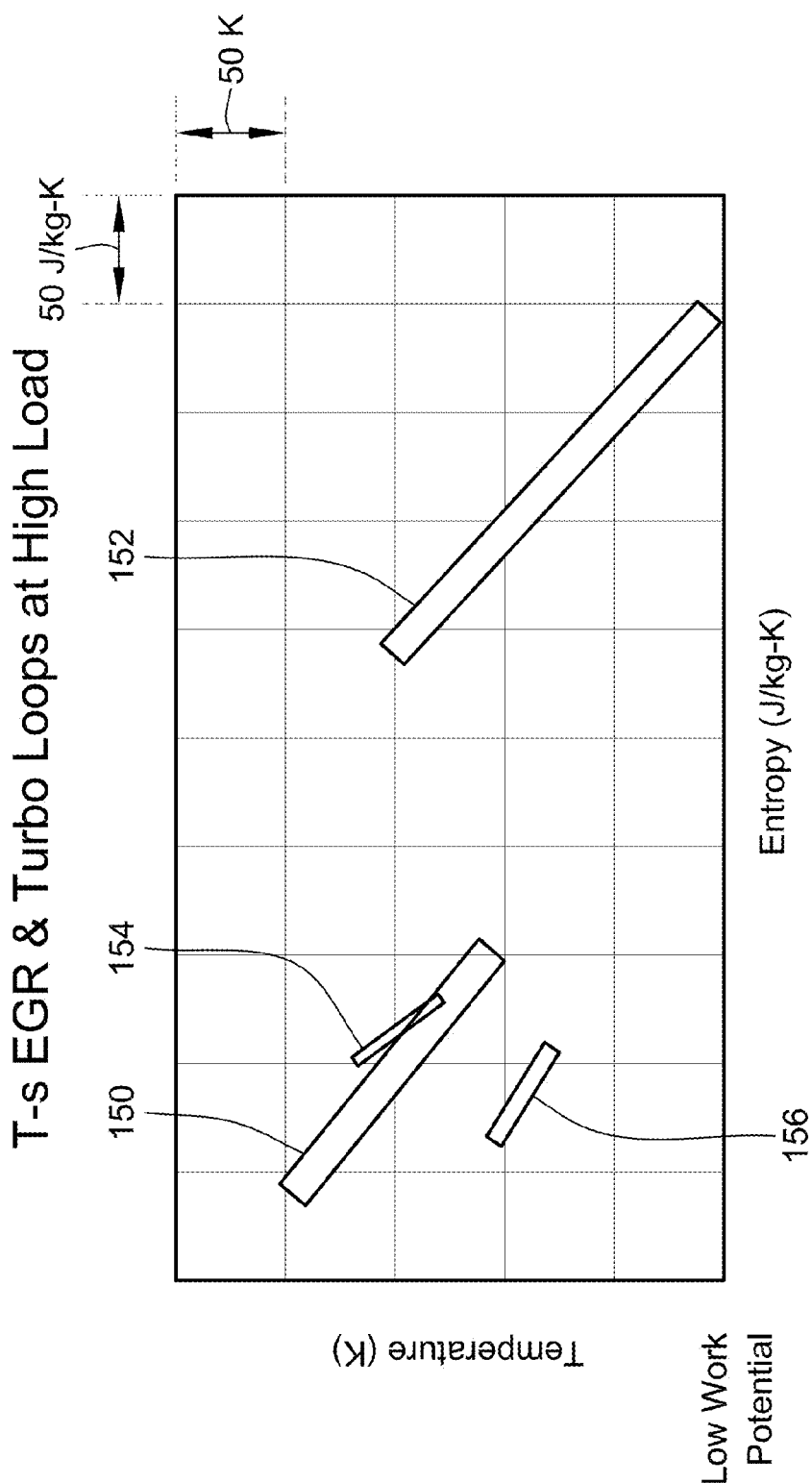
FIG. 3 is a temperature v. entropy graph comparing the thermodynamic properties of the exhaust gases entering the turbine and used as EGR for a stock engine system as compared to an engine system according to FIG. 2.

FIG. 3 illustrates a T-s diagram (temperature vs. entropy) which is used to determine the work potential of a gas state. Gas states in the upper right (high temperature and high entropy) have the highest potential to do work. Gas states in the lower left (low temperature—low entropy) have the lowest work potential. The T-s diagram compares a stock engine system such as in FIG. 1 with an engine system such as an engine system 100 discussed above. This diagram represents a turbocharged diesel engine operating at high load. The results are a schematic representation of engine simulation modeling aimed at producing the same NOx output as a stock engine, but with improved fuel economy and a higher air-fuel ratio for lower soot emissions.

As illustrated in FIG. 3, the exhaust gases 150 at the inlet of the turbocharger of the stock engine have on average a higher temperature, but most importantly, significantly lower entropy than the exhaust gases 152 at the inlet of the turbine 126 of the turbocharger 124 (i.e. the HP exhaust gases) in the split flow design. The temperature differences are partially due to the additional air in the split flow design. By pumping additional air, as well as approximately the same amount of EGR, the split flow design will generally produce slightly lower engine-out exhaust temperatures than the stock engine at the same speed and load conditions. Additionally, the EGR gases 154 of the stock engine have on average a higher temperature and a higher entropy than the EGR exhaust gases 156 (i.e. the LP exhaust gases) in the split flow design.

Therefore, with proper opening time of the HP exhaust valves 120 by the HPEV control device 121, the high work potential gas is sent to the turbocharger 124 according to the boost requirements, while the properly phased LP exhaust valves 122 controlled by the LPEV control device 123 send lower entropy, low temperature gas to the EGR cooler 132 and on to the intake manifold 108 as EGR.

Figure 12:
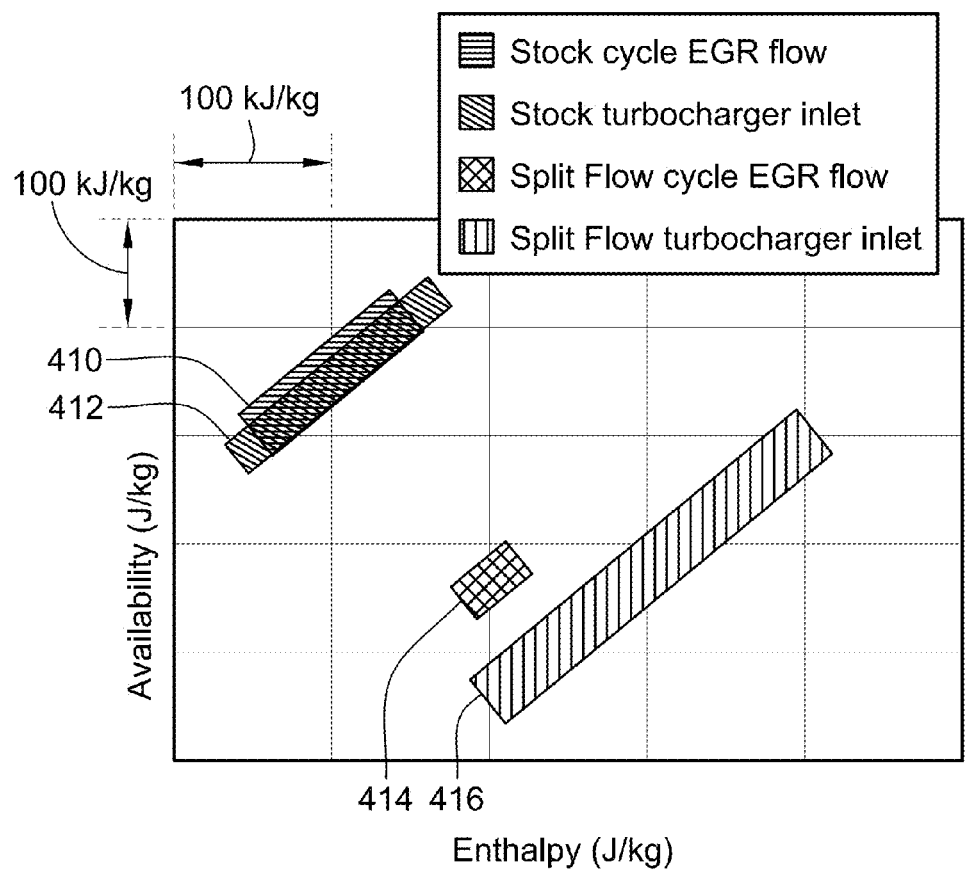
FIG. 12 is an availability v. enthalpy plot comparing the thermodynamic properties of the exhaust gases entering the turbine and used as EGR for a stock engine system as compared to an engine system according to FIG. 2.

FIG. 12 shows a plot of availability vs. enthalpy of the exhaust gas streams from the same operating condition as used in FIG. 3. "Availability" in this instance is generally the ability of the exhaust gas streams to perform work, such as, for example, if the gas stream is run through a turbine of a turbocharger. The plot demonstrates that the availability and enthalpy of the stock engine EGR flow 410 and turbocharger inlet flow 412 are very similar. In contrast, the split flow design separates the enthalpies of the EGR flow 414 and the turbocharger inlet flow 416, delivering higher enthalpy gases with generally greater availability to the turbocharger.

Methods according to embodiments of the present invention, include control strategy for controlling exhaust flow based on EGR flow rate and intake gas pressure set points sent by the main ECU 134. These set points are determined based on the engine operating parameters including, but not limited to, speed, load, transient response requirements, NOx, soot production, ambient pressure and temperature.

The intake gas pressure set point provides the required intake gas pressure. The intake gas pressure requirement is used to determine the turbine power required to meet the intake gas pressure requirement such that the turbocharger 124 can provide the proper boost. Notably, boost is typically the change in pressure over atmospheric pressure while intake gas pressure is typically absolute pressure. However, as used herein, boost and intake gas pressure are generally synonymous. The turbine power necessary to meet the intake gas pressure requirement establishes the flow rate and gas state (e.g. thermodynamic state) of the HP exhaust gases. With this information, the HPEV control device 121 adjusts the timing of the high pressure exhaust valves ("HP valve timing") to provide the turbine input power (based on a thermodynamic calculation) to meet the intake gas pressure requirement.

Figure 4:
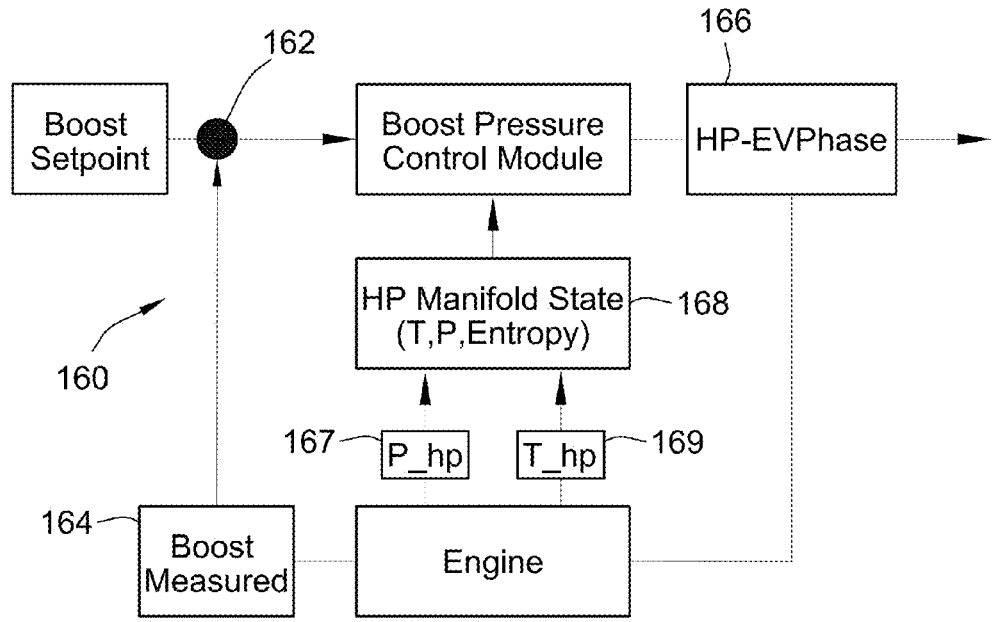
FIG. 4 is a schematic turbine control loop for controlling HP exhaust valves to power the turbine of embodiments of engine systems according to the present invention.

FIG. 4 is a schematic turbine control loop 160 ("TCL 160") for implementing a intake gas pressure control strategy for determining the HP valve timing based on desired intake gas pressure. First, an intake gas pressure set point 162 is obtained from the ECU 134. This set point value is typically determined by a master control loop using, among other things, engine load and speed to determine the desired intake gas pressure. The TCL 160 will measure and analyze actual intake gas pressure 164. If actual intake gas pressure is not equal to the set point intake gas pressure value 162, nor within a predetermined range around the set point value, HP valve timing is adjusted for the HP exhaust valves 120. If actual intake gas pressure is less than the intake gas pressure set point, HP valve timing is advanced to admit higher pressure and temperature gas into the turbine 126 to increase input power and thus increase the turbine/compressor speed and consequently boost of the turbocharger and consequently intake gas pressure. Similarly, if actual intake gas pressure is above the intake gas pressure set point, HP valve timing is retarded to reduce the thermodynamic power of the HP exhaust gas input into the turbine 126 and consequently reduce turbine/compressor speed and thus the boost and consequently the intake gas pressure.

In FIG. 4, a more detailed embodiment is provided. The TCL 160 is a model based control. The model based control incorporates adaptive feed forward and models of the turbine power including an intake gas pressure control model that controls the HP valve timing to control the powering of the turbine of the turbocharger 124. In this embodiment, the pressure 167 and temperature 169 of the HP exhaust gas in the HP exhaust manifold 116 are monitored and used to determine the turbine power based on these parameters 168. This information in combination with the intake gas pressure set point are used to determine the appropriate phasing of the HP exhaust valves 120. This information thus allows for feed forward control to adjust the HP valve timing by calculating the thermodynamic turbine power and calculated boost pressure based on the thermodynamic properties of the HP exhaust gas.

In some embodiments, the intake gas pressure control model is adaptive. In these adaptive models, the actual intake gas pressure, typically measured in the intake manifold, is compared with the intake gas pressure set point. The differences between the actual and set point values can be used to adjust constants within the intake gas pressure control model to maintain the model accuracy for feed forward control. More particularly, if the error between actual boost and calculated boost is outside a predetermined value, the error may be used to modify the model and maintain its accuracy. It should be noted that the intake gas pressure control model including the model constants may be stored in the ECU 134 or in a separate component operably coupled to the ECU 134.

Figure 5:
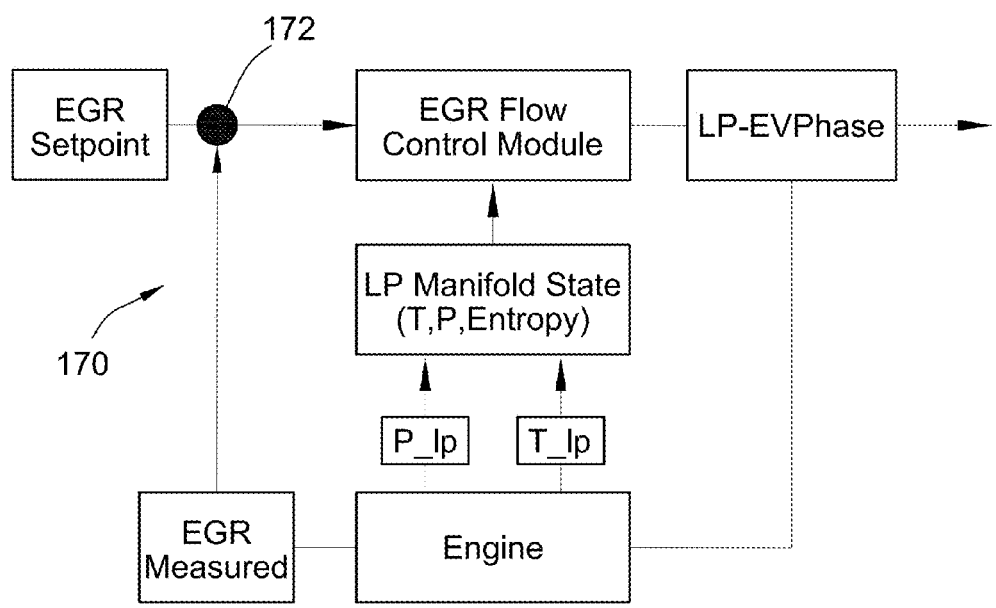
FIG. 5 is a schematic EGR control loop for controlling LP exhaust valves to supply EGR to the intake system of embodiments of engine systems according to the present invention.

With reference to FIG. 5, the timing of the low-pressure exhaust valves ("LP valve timing") is determined to provide the amount of EGR needed to feed the intake system 104. Again, the best exhaust gas for EGR, in contrast to the turbine, is the lowest enthalpy, which is obtained after the bottom of the piston travel, i.e. at bottom dead center ("BDC"), where the combustion gases within the combustion chamber of the internal combustion engine 102 have undergone full expansion cooling. As such, the LP exhaust valves 122 are preferably opened at or after BDC and the amount of EGR flow controlled by how long the LP exhaust valves 122 are left open, expelling exhaust gas to the EGR system 130. However, the LP exhaust timing can be advanced such that the LP exhaust valves 122 can be opened earlier in time (i.e. at an earlier crank angle) to obtain higher in-cylinder pressure for driving the EGR through the LP exhaust manifold 118 and the EGR system 130. Alternatively, the LP exhaust timing can be delayed closer to the end of the exhaust stroke where the in-cylinder pressure is rising due to compression from the piston motion toward top-dead-center. Proper phasing of the LP exhaust valves 122 will minimize the total pumping work (between blowdown and exhaust stroke) required to drive the EGR through the EGR system 130.

EGR flow requirements along with the temperature of the low pressure exhaust gas will be monitored and the valve opening and closing time will be determined to ensure the lowest average temperature of the EGR gas while meeting the total mass flow requirement for proper NOx reduction. An additional benefit of using fully expanded exhaust gas for EGR is that with the lower enthalpy, the parasitic pumping is reduced when moving the EGR through the EGR system 130.

FIG. 5 is a schematic EGR control loop ("EGRCL 170") for implementing EGR control strategy for determining the LP valve timing based on desired EGR flow rate. Again, the EGRCL 170 operates to adjust LP valve timing so as to create sufficient pressure at the lowest temperature to meet the EGR flow rate set point. The EGRCL 170 obtains the EGR flow rate set point 172 from the ECU 134. The EGR flow rate set point 172 is determined by a higher level master control loop using, among other things, engine speed and engine load.

In the simplest embodiment, the LP valve timing is adjusted to meet the EGR flow rate set point 172. As generally indicated above, advancing the LP valve timing during the power stroke generates more pressure to drive the EGR flow through the EGR system 130, but at a price of higher EGR enthalpy. Timing of the transition between the opening of the LP exhaust valve and the closing of the HP exhaust valve will control the amount of EGR delivered to the intake manifold. The LP exhaust valve on a four-stroke engine will almost always open on the upstroke. In such a situation, transfer of the EGR is accomplished using the upward exhaust stroke of the piston. As such, concerns relating to necessary pressure drop between the EGR system 130 and the intake system 104 are mitigated by the fact that the EGR gas can be driven by the piston to the intake system 104. Further, unlike prior art systems, there is, in some embodiments, no other path for the EGR gas to flow, i.e. through the turbine 126 because this path is generally closed off from the EGR path at this point during the piston cycle.

Unlike prior art designs where the single exhaust manifold was plumbed to both the EGR system as well as the turbine of the turbocharger, in the split flow design, the engine system 100 can be configured such that the only flow path for the LP exhaust gas is through the EGR system. As such, the need for proper pressure differential to drive the LP exhaust gas, as EGR, through the EGR system is eliminated as the pistons can drive the EGR through the EGR system.

In a more advanced EGRCL embodiment, a model based control is used to model the EGR flow and engine pumping power and to optimize valve timing and, potentially, the vane positions of the variable geometry turbine (VGT) in calculations within the EGRCL 170.

More particularly, the EGRCL 170 can use an EGR flow control model which may be a theoretical fluid flow model for EGR flow across an orifice (e.g. the minimum area or maximum restriction in the flow path of the EGR system 130). The model may use the EGR temperature, LP manifold pressure, intake manifold pressure as well as a flow restriction area and flow coefficient or discharge coefficient. The model may also include an exhaust gas pulse multiplier. When the model is calibrated, the flow coefficient or discharge coefficient and exhaust gas pulse multiplier are adjusted so as to best model the EGR flow rate for a wide range of engine speed and load operating conditions. Alternatively, the system may be calibrated by using a mass flow measuring device (e.g. an EGR flow rate sensor) in the EGR system 130 such as a virtual sensor, an algorithm analyzing a pressure drop over a known orifice, a hot-wire or a diaphragm displacement device to determine if proper EGR flow rate is provided. This sampling will take place within the EGR system 130 prior to the EGR entering the intake system.

The EGR flow control model will use the LP exhaust gas temperature and LP exhaust gas pressure in addition to the EGR flow rate set point 172 to determine the LP exhaust valve timing.

The EGRCL 170 may be adaptive wherein the EGR flow control model will utilize error between actual EGR flow rate and the EGR flow rate set point to adjust the constants of the EGR flow control model. More particularly, the EGRCL 170 can measure the actual EGR flow rate value and compare that to the EGR flow rate set point. If this error is outside of a predetermined range, the constants of the EGR flow control model can be updated to retain the accuracy of the on-board EGR flow control model. The EGR flow rate sensor used for calibration may also be used for the real-time in situ calibration of the EGR flow control model constants.

Beyond analyzing merely EGR flow rate, the actual temperature of the EGR may be analyzed and used to adjust LP valve timing. For instance, the EGR set point may include an EGR temperature set point. Methods of controlling the flow of exhaust may include comparing actual temperature of the EGR with a temperature set point. The error between the actual and measured values can be used to both adjust LP valve timing as well as to modify the EGR flow control model if the error is outside of predetermined ranges.

NOx production may also be monitored and used to adjust phasing of the HP exhaust valves and the LP exhaust valves. More particularly, actual NOx levels within the exhaust exiting the engine can be measured. The measured NOx levels can be compared to threshold NOx levels to determine if the EGR system is providing sufficient EGR at the proper flow rate and thermodynamic state to reduce NOx below the acceptable threshold levels.

If the measured NOx levels are too high, the phasing of the HP and LP exhaust valves can be adjusted to adjust the portion or state of the exhaust gas that is being used as EGR. Typically, if measured NOx levels are too high, the HP exhaust valve timing may be retarded to try and obtain exhaust gas that has gone through more expansion and performed more work on the pistons of the engine such that it is at a cooler temperature and better for use as EGR. Alternatively, both the HP and LP exhaust valves may be advanced to allow more exhaust gas to supply the EGR loop, or the HP exhaust valve may be phased either way while the LP exhaust valve is advanced, possibly increasing their overlap while allowing a greater amount of EGR.

The measured NOx levels can also be used to adapt and modify any theoretical EGR flow control models. For instance, if measured NOx levels are greater than desired for a given set of engine operating parameters, the EGR flow control models can be adjusted to increase EGR or improve the quality of the exhaust gas used as EGR.

Additionally, the HP valve timing and LP valve timing may be controlled simultaneously using model based multiparametric control to achieve both intake gas pressure and EGR flow rate set points with a combination of the HP valve timing and LP valve timing settings.

Engine system 100 is configured to open the HP exhaust valves 120 within a range of 120° crank to 160° crank after top dead center (ATDC), without a turbo boost facilitation. A turbo boost facilitation can advance opening the HP exhaust valves 120 an extra 5° crank to 10° crank relative to this timing range. By advancing even more, the transient response may be improved. The duration of the HP exhaust valve is typically between about 65-75% of stock. The LP exhaust valve duration is between about 40-50% of stock. Further, overlap between the opening of the LP exhaust valves 122 and closing of the HP exhaust valves 120 may be between 30° crank and 65° crank.

The intake valves 110 are opened in a range of 60° crank to 10° crank before top dead center (BTDC.) However, the duration is increased by up to about 10% longer than the stock engines.

Utilizing these operating methods, the applicants have determined, through modeling, that significant improvements in engine performance can be experienced.

With the general operating environment and control theory described, more particular features, alternative embodiments, configurations and methods of operation will now be described.

Figure 6:
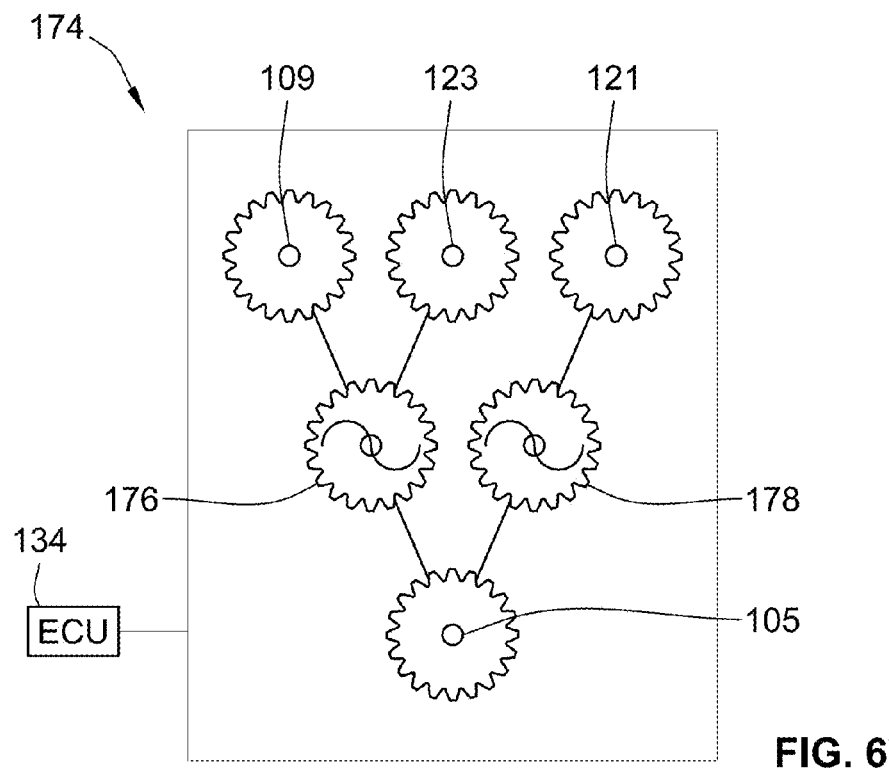
FIG. 6 is an embodiment of a valve control system for adjusting valve timing of the intake, HP exhaust and LP exhaust valves of the engine system where the phasing of the valve timing of the HP exhaust valves is independent of the phasing of the valve timing of the LP exhaust valves and the intake valves.
Figure 7:
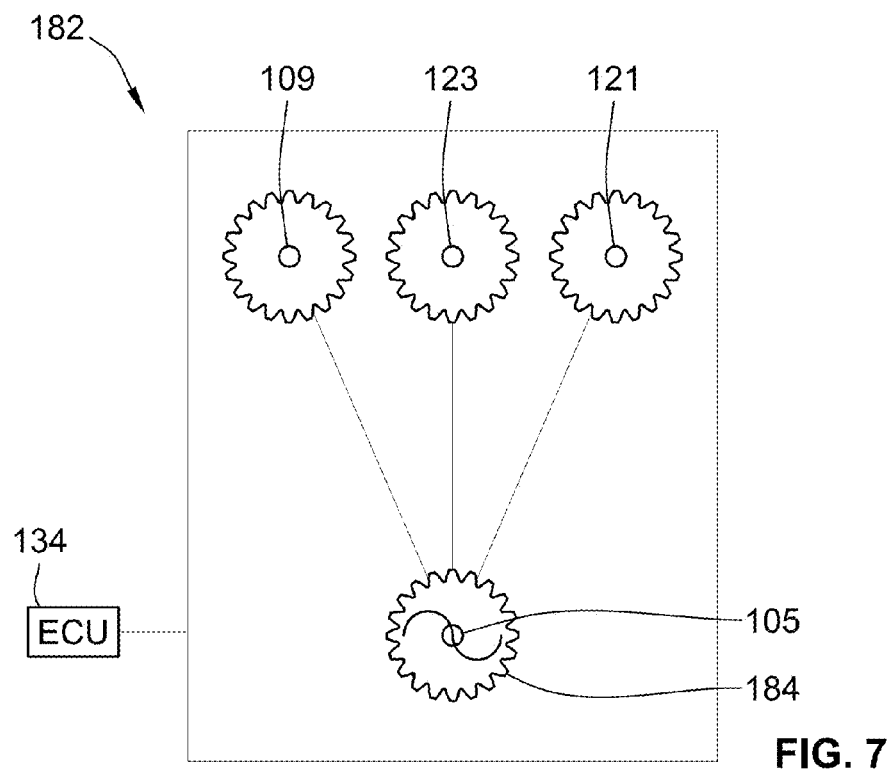
FIG. 7 is an embodiment of a valve control system for adjusting valve timing of the intake, HP exhaust and LP exhaust valves of the engine system where the phasing of all of the valves is equal.

FIGS. 6 and 7 illustrate valve control systems that utilize less than fully independent variable valve timing for all of the valves of the engine system. Instead, at least two, if not all, sets of valves are phased (i.e. advanced or retarded) an equal amount using these valve control systems. While the following embodiments will generally be described as using cam phasers, the following examples are equally applicable to the other types of valve phasing devices discussed above. Further, the various embodiments could use a combination of the different types of valve phasing devices.

FIG. 6 is a simplified schematic illustration of an embodiment of a valve control system 174. The valve control system 174 is operably configured to advance or retard operation, i.e. opening and closing, of the intake valves 110, the HP exhaust valves 120 and the LP exhaust valves 122, where applicable.

The valve control system 174 in this embodiment includes a pair of cam phasers 176, 178 used to adjust valve timing. The ECU 134 may be considered to be part of the valve control system 174 and will perform the steps outlined above and can operatively communicate with or control the operation of the cam phasers 176, 178 to adjust valve phasing.

The first cam phaser 176 is operably coupled between the crankshaft 105 and the IV control device 109, which includes a camshaft in this embodiment. The first cam phaser 176 is also operably coupled between the crankshaft 105 and the LPEV control device 123, which includes a camshaft in this embodiment. The first cam phaser 176 is configured to selectively advance or retard the opening and closing crank angle for the intake valves 110 and LP exhaust valves 122 equally. As such, if the first cam phaser 176 operates to advance timing, for example, 4° crank, both the intake valve timing and the LP valve timing will be advanced 4° crank. As such, the intake valve timing and LP valve timing are mechanically tied. However, valve timing for the HP exhaust valves 120 will not be adjusted as a result of adjustments implemented using the first cam phaser 176.

The second cam phaser 178 is operably coupled between the crankshaft 105 and the HPEV control device 121, which includes a camshaft in this embodiment. The second cam phaser 178 is configured to selectively advance or retard the opening and closing crank angle for the HP exhaust valves 120. This adjustment in the HP valve timing is wholly mechanically independent of any adjustment in valve timing for the intake valves 110 or the LP exhaust valves 122.

While the cam phasers 176, 178 are illustrated schematically as being gears/sprockets interposed between gears/sprockets of the IV control device 109, HPEV control device 121 and LPEV control device 123, the cam phasers 176, 178 could be operably attached to individual ones of the camshafts. For instance, the gear/sprocket illustrated as part of the HPEV control device 121 could be completely replaced by the second cam phaser 178. Similarly, the gear/sprocket illustrated as part of the IV control device 109 or the LPEV control device 123 could be replaced by the first cam phaser 176.

Further, while cam phaser 176 is illustrated as operably engaging two separate gears/sprockets, the IV control device 109 and the LPEV control device 123 could be provided by a single camshaft with the IV control device 109 being a first set of cam lobes on the camshaft and the LPEV control device 123 could be a second set of cam lobes on that same camshaft. The cam phaser could then be directly attached or mounted on the end of that camshaft. Alternatively, other valve phasing devices could be used, such as discussed above.

FIG. 7 is a simplified schematic illustration of another embodiment of a valve control system 182. Like the prior valve control system 174, valve control system 182 is operably configured to retard or advance operation, i.e. opening and closing, of the intake valves 110, the HP exhaust valves 120 and the LP exhaust valves 122. However, the valve control system 182 is more simplified than valve control system 174.

The valve control system 182 in this embodiment includes a single cam phaser 184 used to adjust valve timing. Again, the ECU 134 may be considered to be part of the valve control system 182 and will perform the steps outlined above and can operatively communicate with or control the operation of the cam phaser 184.

Cam phaser 184 is illustrated attached to crankshaft 105 and is operably coupled to the IV control device 109, the LPEV control device 123 and the HPEV control device 121. While illustrated as being directly coupled to each of the three valve control devices 109, 121, 123, the cam phaser 184 could be directly coupled to one of the valve control devices 109, 121, 123 and then the three valve control devices 109, 121, 123 could be operably interconnected rather than each being directly coupled to cam phaser 184.

In this embodiment, the single cam phaser 184 is configured to selectively simultaneously advance or retard the operation, i.e. opening and closing crank angle, of the intake valves 110, the HP exhaust valves 120 and LP exhaust valves 122 equally relative to the crankshaft 105. This valve control system 182 may, thus, be referred to as an all-equal variable valve timing control system ("all-equal VVT control system").

In this valve control system 182, if the cam phaser 184 operates to advance timing, for example, 4° crank, each of the intake valve timing, the HP valve timing and the LP valve timing will be advanced 4° crank. As such, the intake valve timing, HP valve timing and LP valve timing are mechanically tied such that adjustment to one results in adjustment to all.

Further, while cam phaser 184 is illustrated as operably engaging three separate gears/sprockets, the IV control device 109, HPEV control device 121, and the LPEV control device 123 could be provided by a single camshaft with the IV control device 109 being a first set of cam lobes on the camshaft, the HPEV control device 121 being a second set of lobes on the camshaft and the LPEV control device 123 being a third set of cam lobes on that camshaft. The cam phaser could then be directly attached or mounted on the end of that camshaft. Alternatively, other valve phasing devices could be used, such as discussed above.

These two valve control systems 174, 182 are simpler than utilizing fully independent valve timing for each of the three different sets of valves 110, 120, 122. Therefore, each reduction in cam phaser provides an advantage in simplicity of construction, reduction in maintenance, and risk of damage.

Figure 13:
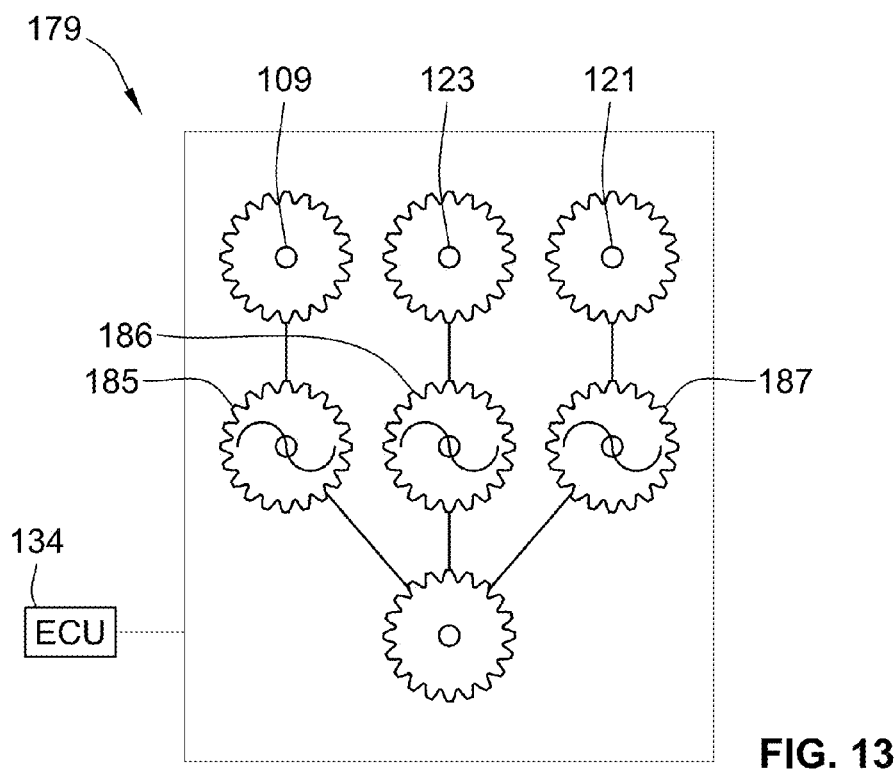
FIG. 13 is an embodiment of a valve control system for adjusting valve timing of the intake, HP exhaust and LP exhaust valves of the engine system where the phasing of all of the valves is independent.

It should be noted that embodiments of the invention are not prevented from using fully independent valve timing for each of the three sets of valves 110, 120, 122. FIG. 13 illustrates such an embodiment of a fully independent valve control system 179 that includes three cam phasers 185-187. Each cam phaser independently controls the valve timing of an individual set of valves. For instance, cam phaser 185 can control the valve timing of the intake valves 110, cam phaser 186 can control the valve timing of the HP exhaust valves 120, and cam phaser 187 can control the valve timing of the LP exhaust valves 122. Again, other types of valve phasing devices could be used to provide the fully independent valve timing. Further, a mix of valve phasing devices could be implemented to control individual ones of the IV, HP and LP valves 110, 120, 122.

Other embodiments of the invention can use fixed timing for the intake valves 110 while allowing for phasing of the HP exhaust valves 120 and LP exhaust valves 122. (This, for example, could occur in uniflow two-stroke diesel engines discussed below where the intake timing is fixed.) The phasing of the HP exhaust valves 120 and LP exhaust valves 122 could be tied to one another or be independent of one another. For instance, a single valve phasing device could be used to simultaneously adjust both the HP and LP exhaust valves 120, 122 (i.e. a single cam phaser coupled to a single camshaft with two different sets of cam lobes). Alternatively, two separate valve phasing devices could be used to adjust the timing of the HP exhaust valves 120 independently of the LP exhaust valves 122. For instance, two separate camshafts could be used along with two separate cam phasers. One cam shaft controls the HP exhaust valves 120 and the other camshaft controls the LP exhaust valves 122. Each camshaft would have its own phasing device such as separate cam phasers. Alternative means for phasing the valve timing of the HP and LP exhaust valves 120, 122 could be used. When the HP exhaust valves 120 are adjusted independently of the LP exhaust valves 122, the valve phasing devices controlling the phasing thereof could be of different types for the different types of valves.

The following chart is a non-exhaustive list of some different combinations for different valve phasing/timing configurations:

| Intake and Exhaust Timing Variable | | | Exhaust Timing Variable (IV Fixed) | |
|---|---|---|---|---|
| All Equal | 2 Different Timing Adjustments (IV + LPEV with HPEV independent) | All Valves Independent | All Equal | Independent |
| (IV + HPEV + LPEV) | | | | |
| 1 CP (1, 2 or 3 camshafts) | 2 CP (2 or 3 camshafts) | 3 cam phasers (3 camshafts) | 1 CP (1 or 2 camshafts) | 2 CP (2 camshafts) |
| 1 linked IPM | 1 CP + 1 IPM | 2 CP (2 camshafts) + 1 IPM | 1 IPM | 1 CP (1 camshaft) + 1 IPM |
| EH | 2 IPM | 1 CP + 2 IPM | EH | 2 IPM |
| EM | EH | 3 IPM | EM | EH |
| | EM | | | EM |

In the prior table, CP stands for a cam phaser, IPM stands for an independent phase mechanism such as the alternative valve phasing devices discussed above, EH stands for an electrohydraulic valve phasing device and EM stands for an electromechanical valve phasing device.

Figure 8:
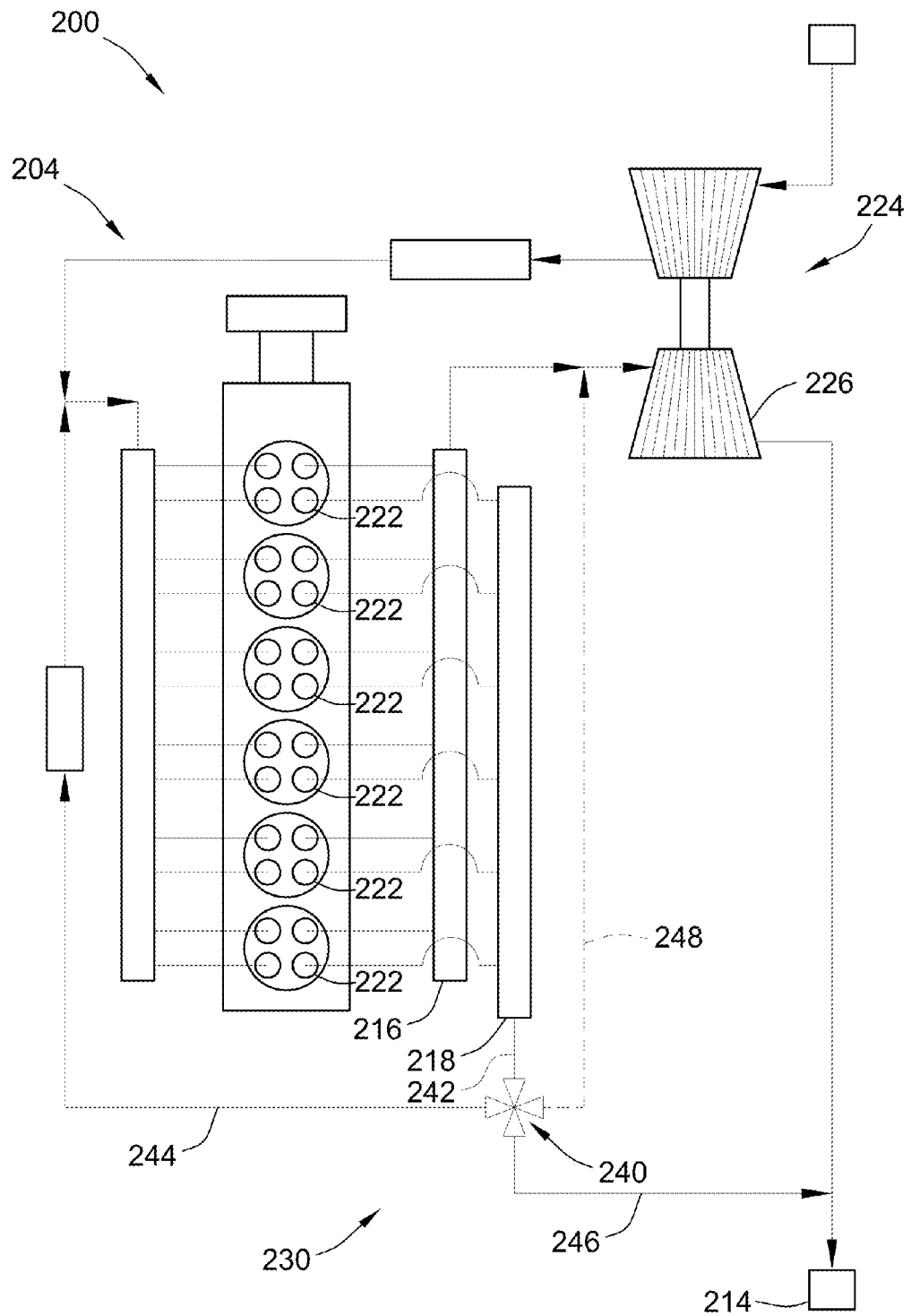
FIG. 8 is a schematic illustration of an alternative embodiment of an engine system according to the present invention including a split flow exhaust arrangement including a diverter valve arrangement.

FIG. 8 illustrates a further embodiment of an engine system 200 according to the teachings of the present invention.

Engine system 200 utilizes a split flow exhaust arrangement similar to engine system 100, except it has a modified EGR system 230 that allows for dumping EGR. The EGR system 230 includes a diverter system including a diverter valve 240 that directs the flow of LP exhaust gas that is expelled to the LP exhaust manifold 218. In this embodiment, the diverter valve 240 is not an EGR valve. The diverter valve 240 is not used to incrementally throttle the EGR, but merely redirect where it goes. Therefore, the diverter valve will only be operated in "open" and "closed" states. The diverter valve will not operate to define a broad range of fluid flows as compared with an EGR valve. Further, the diverter valve 240 need not be a one-way valve to combat intake pressure due to the fact that the EGR system 230 will not couple the intake system 204 to the turbocharger 224.

The EGR system 230 includes an upstream duct 242 upstream of the diverter valve 240 that directs the LP exhaust gases to the diverter valve 240. A first downstream duct 244 fluidly connects the diverter valve 240 to the intake system 204 of the engine system 200. When the diverter valve 240 couples the upstream duct 242 with the first downstream duct 244, the LP exhaust gases form EGR and are directed to the intake system 204.

A second downstream duct 246 is fluidly interposed between the exhaust gas outlet 214 and the diverter valve 240. The second downstream duct 246 is coupled between the exhaust gas outlet 214 and the turbine 226 of turbocharger 224. When the diverter valve 240 couples the upstream duct 242 with the second downstream duct 246, the LP exhaust gases are merely exhausted from the engine system 200 through exhaust outlet 214 and are not used as EGR.

A third downstream duct 248 may also be optionally present. Therefore, this third downstream duct 248 is illustrated in dashed lines. The third downstream duct 248 is fluidly interposed between the diverter valve 240 and the pathway between the HP exhaust manifold 216 and the turbine 226. When the diverter valve 240 couples the upstream duct 242 with the third downstream duct 248, the LP exhaust gases are directed towards the turbine 226 to assist in generating boost by further powering the turbocharger 224.

Again, the diverter valve 240 merely opens and closes individual pathways and does not incrementally throttle the amount of flow through the individual pathways between fully open or fully closed. LP exhaust valves 222 control flow of exhaust gases from the cylinders into LP exhaust manifold 218 and thence to diverter valve 240. Thus, the diverter valve operates on an "all or nothing" principle.

Figure 9:
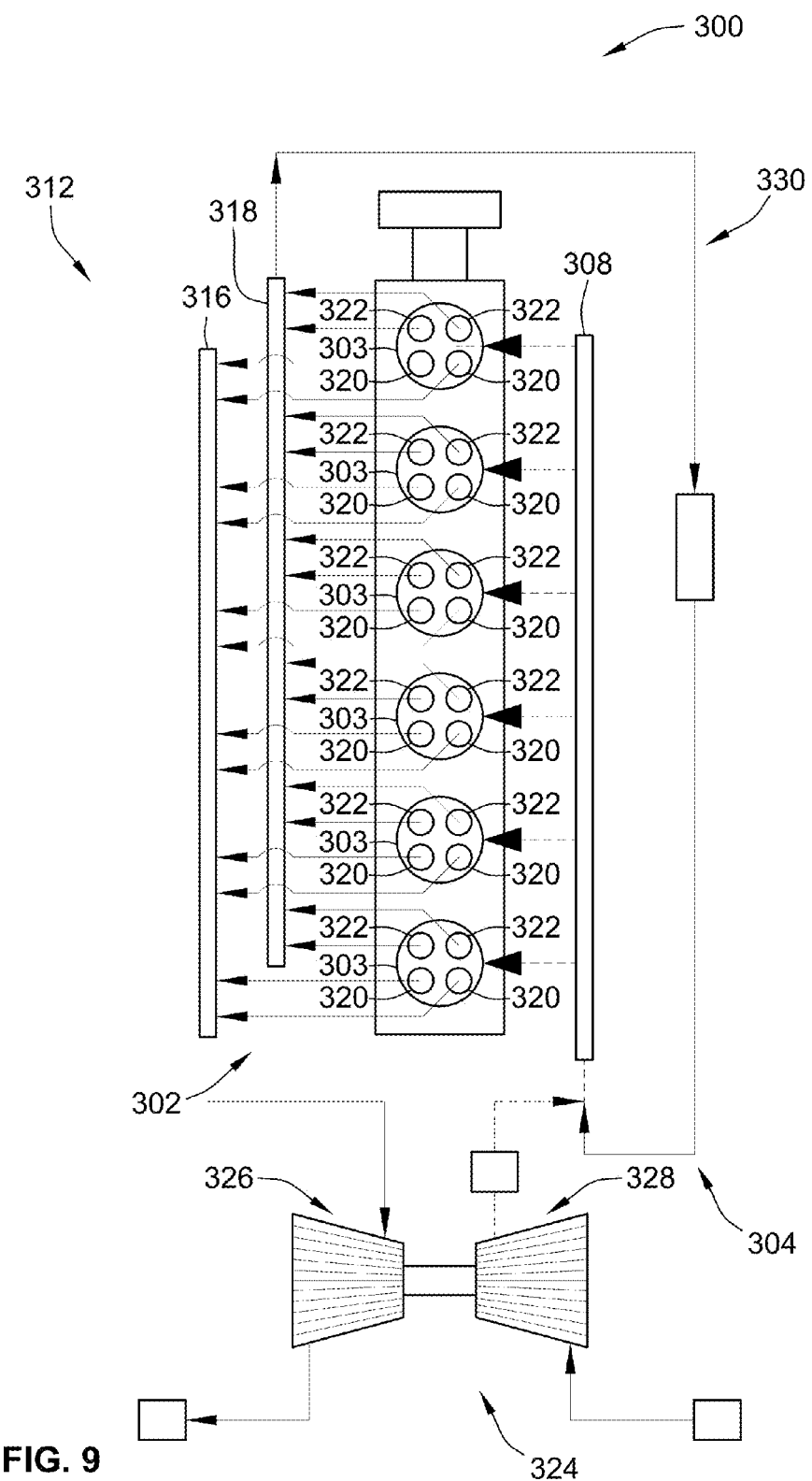
FIG. 9 schematic illustration of an embodiment of an engine system according to the present invention including a split flow exhaust arrangement wherein the engine system is a uniflow two-stroke engine system.

The prior engine systems 100, 200 are typically used for four-stroke engine systems. However, a further embodiment of an engine system 300 according to the invention is illustrated in FIG. 9. This engine system 300 is a uniflow two-stroke engine.

Engine system 300 is similar in many ways as the prior engine systems 100 and 200 and only the primary differences will be described.

In this embodiment, the engine system 300 includes an internal combustion engine 302 that includes a row of cylinders 303 having pistons therein. The cylinders 303 communicate with an intake system 304 for receiving induction gases and an exhaust system 312 for carrying the combusted exhaust gases generally away from internal combustion engine 302. The exhaust system 312 utilizes a split flow design and includes an HP exhaust manifold 316 as well as an LP exhaust manifold 318. A vee configuration engine (not shown) may have multiple HP and/or LP manifolds that may or may not be connected.

In this embodiment, the internal combustion engine 302 includes four moveable valves proximate the top of the combustion chamber. However, all of these valves are exhaust valves. More particularly, each cylinder includes two HP exhaust valves 320 and two LP exhaust valves 322. However, alternative embodiments only require at least one HP exhaust valve and at least one LP exhaust valve. The HP exhaust valves 320 are interposed between the cylinder 303 and the HP exhaust manifold 316. The LP exhaust valves 322 are interposed between the cylinder 303 and the LP exhaust manifold 318.

A turbocharger 324 includes a turbine 326 within the exhaust system 312 downstream from the HP exhaust manifold 316 and a compressor 328 within the intake system 304 upstream from the plenum of the intake manifold 308 of the intake system 304.

The LP exhaust manifold 318 is fluidly connected to the intake system 304 by an EGR system 330.

Figure 10:
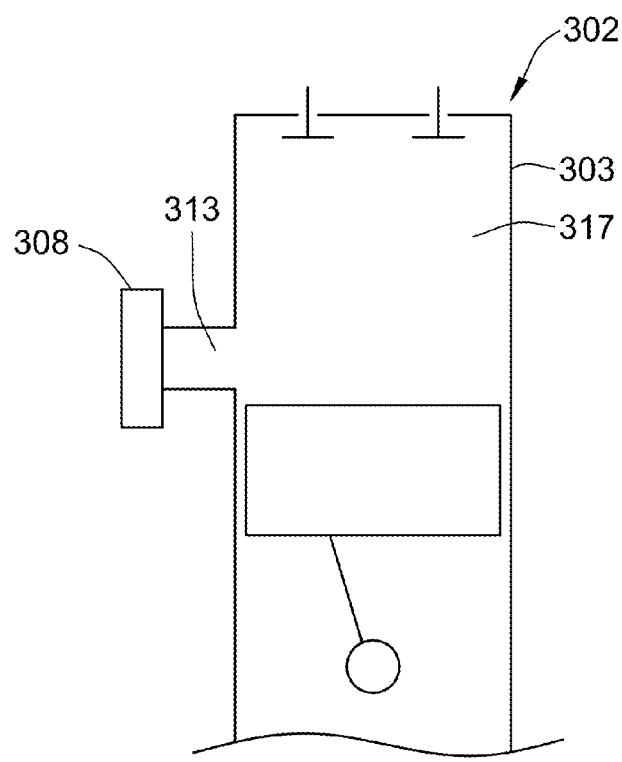
FIG. 10 is a simplified illustration of the internal combustion engine of the engine system of FIG. 9.

With additional reference to the simplified illustration of FIG. 10, unlike the prior engine systems 100, 200, the internal combustion engine 302 utilizes one or more intake ports 313 that fluidly communicate the combustion chamber 317 with the intake manifold 308 to supply induction gases to the combustion chamber 317. The intake ports 313 are generally positioned proximate the bottom or base of the cylinders (not shown) beneath the combustion chambers 317.

Because the gases move through the cylinder 303, and particularly combustion chamber 317, in one direction, this engine 312 is considered a uniflow engine.

Figure 11:
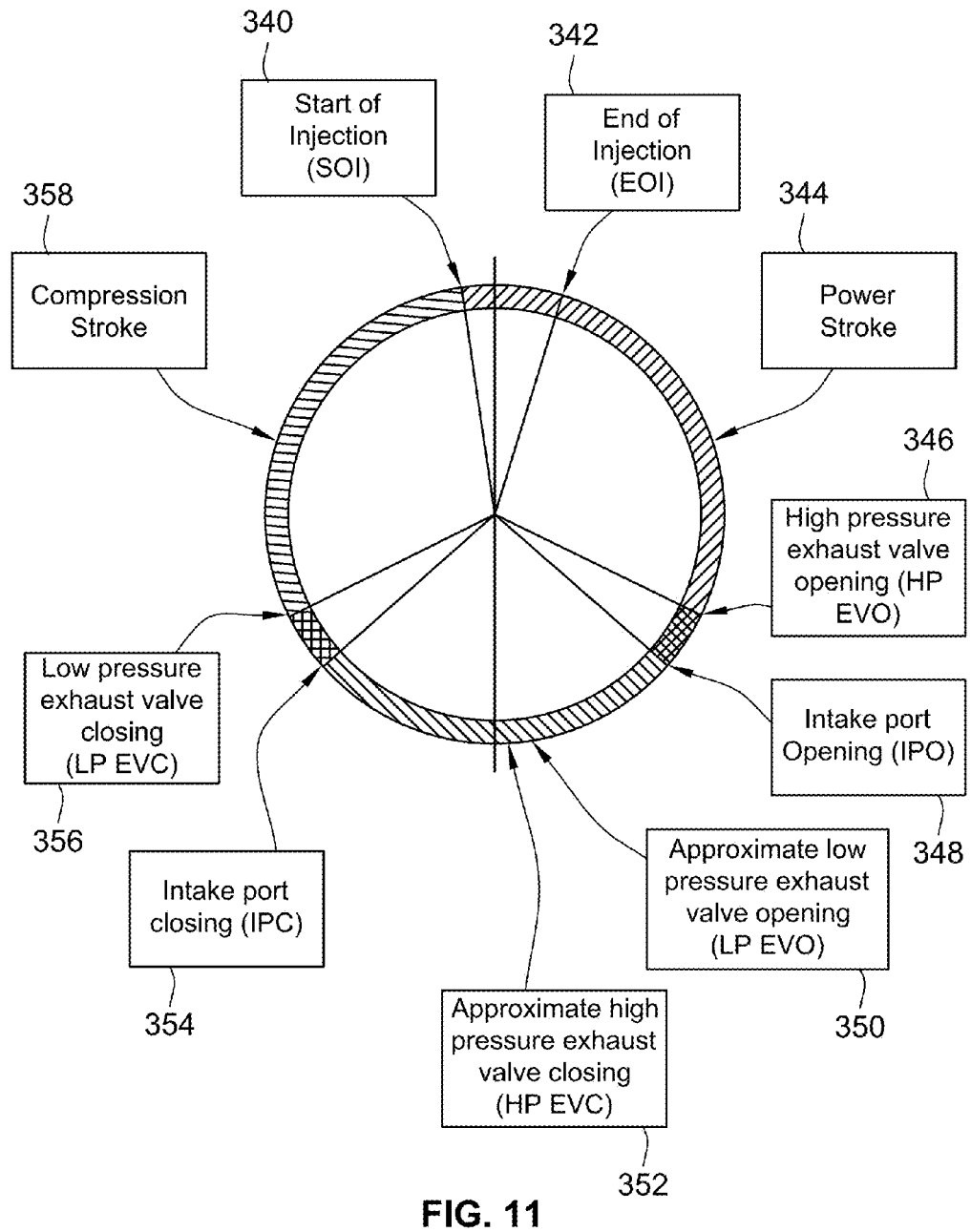
FIG. 11 is a chart illustrating the crank angle for various operations of the internal combustion engine of the engine system of FIG. 9.

The valve timing and the intake port opening and closing for the engine system 300 is illustrated in FIG. 11. The power cycle for the internal combustion engine 302 will be explained with reference to FIG. 11.

Just before top dead center ("TDC"), the start of fuel injection 340 will occur. After the piston has begun its descent and a little past TDC the end of fuel injection 342 will occur. The power stroke 344 will then occur as the mixed fuel and intake gases (plus EGR) combust driving the piston towards bottom dead center ("BDC"). At approximately 100° crank angle ATDC, the HP exhaust valves 320 will open 346. With the HP exhaust valves open, the piston will pass the intake port 313 at approximately 135° ATDC and open the intake ports 348 in the sidewall of the cylinder 303.

Within 30° crank either side of BDC, the LP exhaust valves 322 will open 350. Within 30° crank after opening of the LP exhaust valves 322, the HP exhaust valves 320 will close 352. The intake ports 313 will then close 354 as the piston travels back towards TDC passing the intake ports 313. Shortly after closing of the intake ports 313, the LP exhaust valves 322 will close 356. At this time, all valves and ports are closed and the compression stroke 358 will occur.

As in the four-stroke engine case, valve timing of the two-stroke HP and LP exhaust valves will be varied, in this case either independently or in unison. The range of valve timing change will be less than 30° crank typically. A variable geometry turbocharger will be advantageous for the greatest improvement in performance. The various valve timing arrangements and mechanisms discussed can be incorporated into the two-stroke engines. However, there will not be a mechanism for adjusting the timing of the intake as that is a fixed parameter in two stroke engines.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An internal combustion engine system comprising:
   an internal combustion engine defining a combustion cylinder;
   an intake system to deliver intake gases to the engine;
   an exhaust system to carry exhaust gases away from the engine, the exhaust system comprising:
      a high pressure exhaust manifold;
      a high pressure exhaust valve interposed between the combustion cylinder and the high pressure exhaust manifold;
      a low pressure exhaust manifold;
      a low pressure exhaust valve interposed between the combustion cylinder and the low pressure exhaust manifold;
   a turbocharger including a turbine in the exhaust system in fluid communication with the high pressure exhaust manifold;
   an exhaust gas recirculation system (EGR system) fluidly coupling the low pressure exhaust manifold to the air intake system, the EGR system being free of an exhaust gas recirculation valve (EGR valve) interposed between the low pressure exhaust manifold and the air intake system.

2. The system of claim 1, wherein the EGR system includes an exhaust gas recirculation cooler (EGR cooler).

3. The system of claim 1, further comprising a diverter system within the EGR system, the diverter system configured to fluidly connect the low pressure exhaust manifold to the air intake system in a first state and fluidly connect the low pressure exhaust manifold to an exhaust outlet downstream of the turbine in a second state, the diverter system not able to incrementally adjust the amount of flow from the low pressure exhaust manifold to the air intake system through the diverter system.

4. The system of claim 1, further comprising a diverter system within the EGR system, the diverter system configured to fluidly connect the low pressure exhaust manifold to the air intake system in a first state and fluidly connect the low pressure exhaust manifold to the exhaust system upstream of the turbine in a second state, the diverter system not able to incrementally adjust the amount of flow therethrough.

5. The system of claim 1, wherein the fluid coupling between the low pressure exhaust manifold and the air intake system is free of valves.

6. The system of claim 1, further comprising a low pressure exhaust valve control device operably coupled to the at least one low pressure exhaust valve to control opening and closing of the low pressure exhaust valve, the low pressure exhaust valve control device configured to open the low pressure exhaust valve control device at or after bottom dead center of a piston within the combustion cylinder of a four-stroke engine.

7. The system of claim 1, further comprising a valve control system configured to control opening and closing of the high pressure exhaust valve and control opening and closing of the low pressure exhaust valve, the valve control system configured to vary the opening and closing angles of the high pressure exhaust valve and configured to vary the opening and closing angles of the low pressure exhaust valve.

8. The system of claim 7, wherein the valve control system is configured to adjust opening and closing of the high pressure exhaust valve independent of the opening and closing of the low pressure exhaust valve.

9. The system of claim 7, wherein the valve control system is configured to retard or advance the opening and closing of the high pressure exhaust valve and configured to retard or advance the opening and closing of the low pressure exhaust valve.

10. The system of claim 7, further comprising an intake valve, the valve control system is configured to control opening and closing of the intake valve.

11. The system of claim 10, wherein the valve control system is configured to jointly retard or advance opening and closing of the intake valve and retard or advance opening and closing the low pressure exhaust valve such that the timing of the intake valve and low pressure exhaust valve must be advanced or retarded together.

12. The system of claim 11, wherein the valve control system is configured to retard or advance opening and closing of the high pressure exhaust valve independent of any adjustment in retarding or advancement of the opening and closing of the intake valve.

* * * * *